(12) United States Patent
Ramer et al.

(10) Patent No.: US 6,342,695 B1
(45) Date of Patent: Jan. 29, 2002

(54) ENHANCEMENTS IN RADIANT ENERGY TRANSDUCER SYSTEMS

(75) Inventors: David P. Ramer, Reston; Jack C. Rains, Jr., Herndon; Richard S. Bagwell, Chesterfield, all of VA (US)

(73) Assignee: Advanced Optical Technologies, LLC, McLean, VA (US)

( * ) Notice: Subject to any disclaimer, the term of this patent is extended or adjusted under 35 U.S.C. 154(b) by 0 days.

(21) Appl. No.: 09/506,385

(22) Filed: Feb. 18, 2000

Related U.S. Application Data

(63) Continuation-in-part of application No. 09/052,070, filed on Mar. 31, 1998, now Pat. No. 6,064,061.

(51) Int. Cl.⁷ .................................................. H01J 40/14
(52) U.S. Cl. .......................... 250/214 R; 250/237 R; 362/298
(58) Field of Search .......................... 250/227.24, 228, 250/237 R, 214 R; 362/298, 301, 351

(56) References Cited

U.S. PATENT DOCUMENTS

| | | |
|---|---|---|
| 1,998,967 A | 4/1935 | Raynolds |
| 3,809,911 A | 5/1974 | Natens |
| 4,034,217 A | 7/1977 | Dumont |
| 4,947,292 A | 8/1990 | Vlah |
| 5,153,426 A | 10/1992 | Konrad et al. |
| 5,227,632 A | 7/1993 | Armstrong et al. |
| 5,438,495 A | 8/1995 | Ahlen et al. |
| 5,471,053 A | 11/1995 | Diner et al. |
| 5,705,804 A | 1/1998 | Ramer et al. |
| 5,733,028 A | 3/1998 | Ramer et al. |
| 5,773,819 A | 6/1998 | Ramer et al. |
| 5,877,490 A | 3/1999 | Ramer et al. |
| 5,877,849 A | 3/1999 | Ramer et al. |
| 5,886,351 A | 3/1999 | Ramer et al. |
| 5,914,487 A | 6/1999 | Ramer et al. |
| 5,967,652 A | 10/1999 | Ramer et al. |
| 5,971,571 A | 10/1999 | Rose |
| 6,064,061 A * | 5/2000 | Ramer et al. ............... 250/237 |

FOREIGN PATENT DOCUMENTS

| | | |
|---|---|---|
| WO | 97/27450 | 7/1997 |
| WO | 99/50626 | 10/1999 |

* cited by examiner

Primary Examiner—Robert H. Kim
Assistant Examiner—Courtney Thomas
(74) Attorney, Agent, or Firm—McDermott, Will & Emery

(57) ABSTRACT

Many applications of radiant energy transducer systems call for specific performance characteristics over predetermined fields or surfaces. Constructive occlusion utilizes diffuse reflectivity and a mask sized/positioned to occlude an active optical area, such as an aperture of a reflective cavity, to provide tailored performance characteristics. Constructive occlusion alone or in combination with other techniques enable tailoring of the performance of a radiant energy transducer system to meet requirements of specific applications. One mechanism used to further tailor performance involves a non-diffuse reflective shoulder along a peripheral section of the mask and cavity system. Another technique involves using a retro-reflective surface, for example along a portion of the periphery of the system. Another technique involves use of a reflective wall along one side of the system, to limit the field of view to angles on the opposite side of the axis of the mask and cavity configuration.

43 Claims, 17 Drawing Sheets

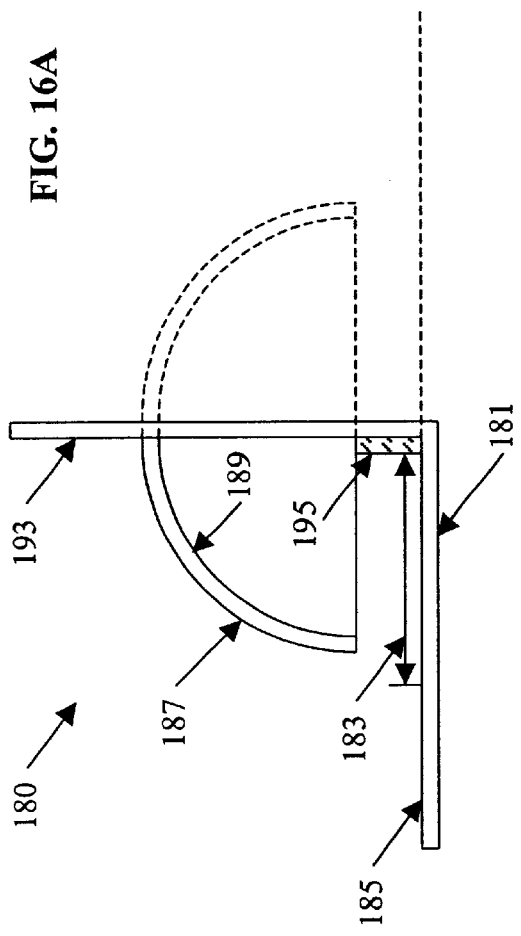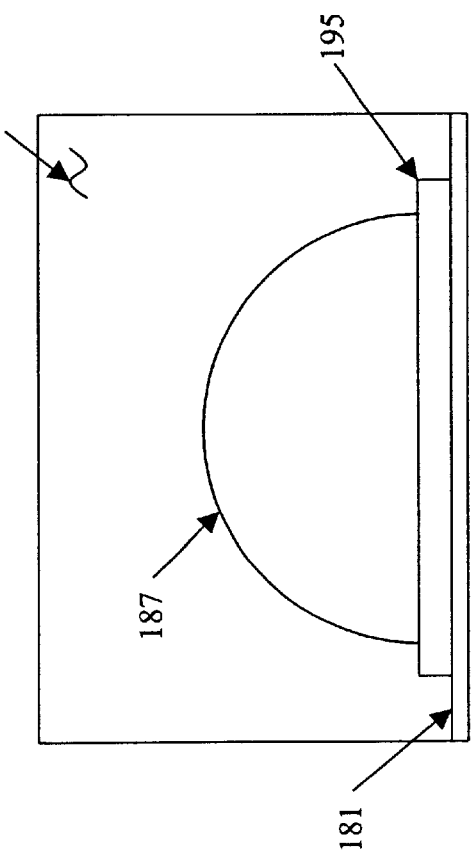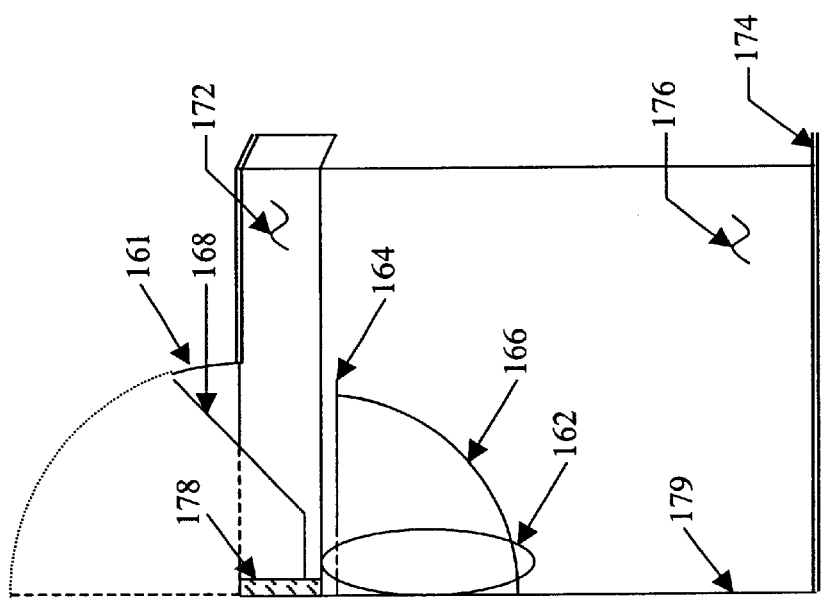

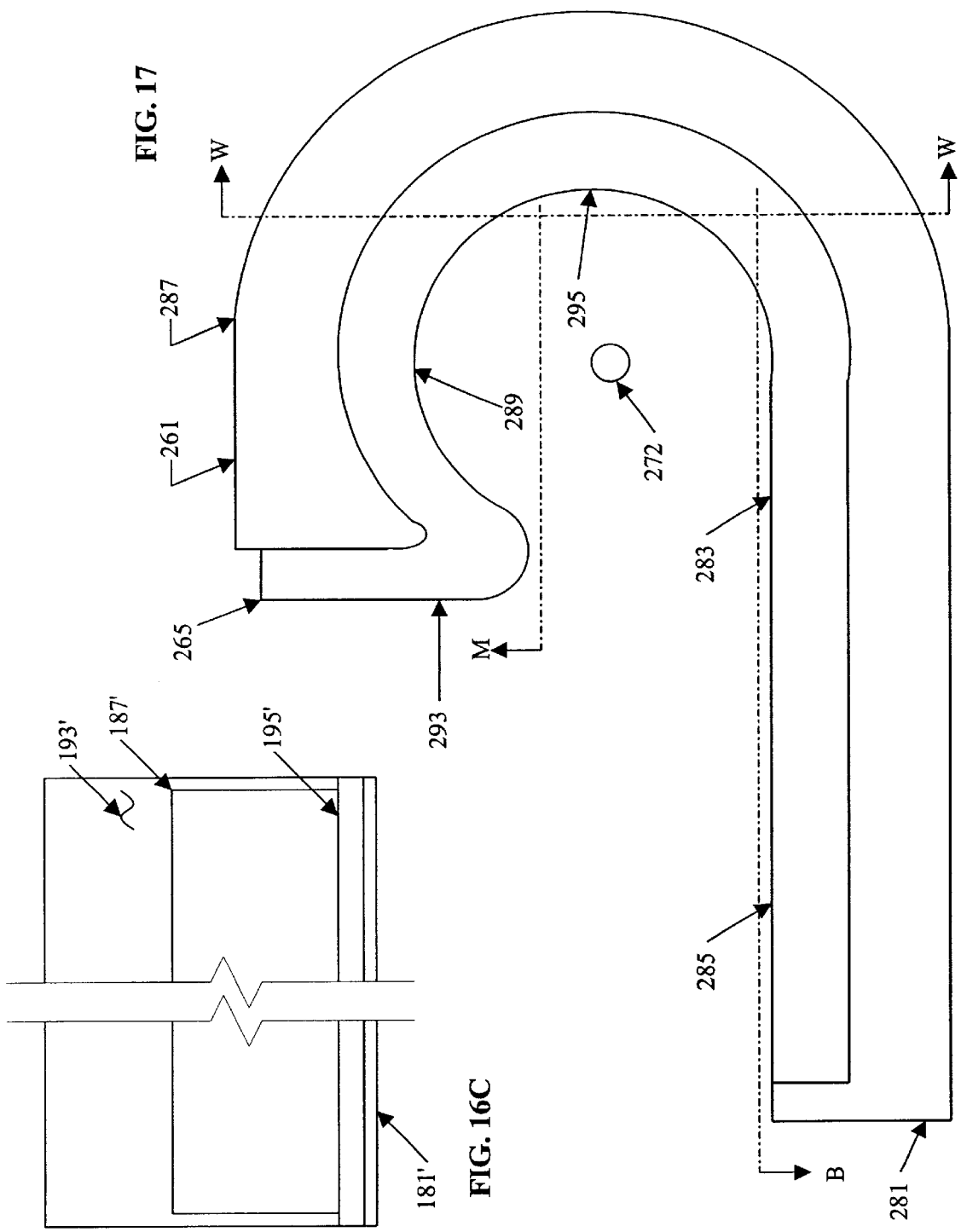

ENHANCEMENTS IN RADIANT ENERGY TRANSDUCER SYSTEMS

CROSS-REFERENCE TO RELATED APPLICATION

This application is a continuation-in-part of U.S. patent application Ser. No. 09/052,070, filed Mar. 31, 1998 now U.S. Pat. No. 6,064,061, entitled "Enhancements in Radiant Energy Transducer Systems," the disclosure of which is entirely incorporated herein by reference.

FIELD OF THE INVENTION

The present inventions relate to transducer systems for emitting or detecting radiant energy, for example optical energy. The inventive concepts involve transducer systems utilizing principles of constructive occlusion as well as specific techniques for tailoring the performance characteristics of such systems.

BACKGROUND

Radiant energy transducers find a wide range of applications in modem technology. Electrically driven transducers, for example, emit radiation to illuminate a desired area or footprint. The transducer system may illuminate the area for a number of reasons. For example, if the emitting transducer emits visible light, the illumination may facilitate use of the area by human personnel. If the illumination of the area provides infrared radiant energy, the illumination may facilitate some associated detection operation or human monitoring of the area through special night vision equipment.

Other radiant energy transducers detect radiant energy from within a desired field of view and provide signals for further electrical processing. For example, a light detecting transducer may provide signals that a processor can analyze to determine the direction and/or intensity of incoming light. The processed information may represent a position of a reflective object or light source within the field of view. These are just a few examples of the applications of radiant energy transducer systems.

Different applications of radiant energy transducers require different transducer performance characteristics. For example, an illumination application might require that the transducer uniformly illuminate a flat surface of a specified area (the footprint) at a known distance and angle from the transducer with a specified radiation intensity. Typically, the specification for such an illuminating transducer would not specify the amount of radiation transmitted to areas outside the specified footprint. Simple radiation sources, such as light bulbs or lights with reflectors and/or lenses typically distribute a substantial amount of radiation outside the desired footprint. This reduces efficiency. Stated another way, to achieve the desired illumination intensity within the footprint, the power applied to the transducer must be relatively large in order to allow for the energy lost to areas outside the desired footprint. Also, such a system often over radiates a portion of the desired footprint.

Similar problems arise in radiant energy detecting transducers. To insure adequate sensitivity to energy from within the field of view, the transducer typically will receive additional radiant energy from outside the desired field of view. Also, it often is difficult to maintain uniform sensitivity over the entire field of view.

Prior attempts to address these problems have involved complex arrangements of lenses and reflectors. Such arrangements make transducer manufacture expensive. Such arrangements also are subject to problems of misalignment and raise concerns about the durability and ruggedness, in applications outside of laboratory conditions.

A need therefore exists for radiant energy transducer systems, e.g. emitters and detectors, having high efficiency and desired operational characteristics for specific applications. The transducer systems should be relatively easy to manufacture and therefore relatively inexpensive. Also, there is a need for transducers of this type that are relatively rugged and durable, when used in real applications.

CONSTRUCTIVE OCCLUSION

Applicants have developed a number of radiant energy transducer systems, which reduce some of the above noted problems, based on a theory of beneficial masking referred to as 'Constructive Occlusion'. Constructive Occlusion type transducer systems utilize an electrical/optical transducer optically coupled to an active area of the system. The systems utilize diffusely reflective surfaces, such that the active area exhibits a substantially Lambertian characteristic. For example, the active area may comprise a diffusely reflective cavity formed in a base. A mask occludes a portion of the active area of the system, in the example, the aperture of the cavity, in such a manner as to achieve a desired response characteristic for the system.

For example, in a series of prior related cases, applicants disclosed cavity and mask based transducer systems that provide uniform response characteristics (e.g. emission energy for light distributors or sensitivity for detectors) over a wide range of angles relative to the transducer system. The prior Constructive Occlusion cases include U.S. Pat. Nos. 5,705,804, 5,773,819, 5,733,028 and 5,914,487, the disclosures of which are incorporated entirely herein by reference.

Applicants' prior Constructive Occlusion type transducer systems have allowed considerable tailoring of the optical/electrical performance characteristics of radiant energy transducing systems. However, some desired applications require still further enhancements to achieve the desired system characteristics, and a need still exists to further increase the efficiency of the transducer systems. For example, a need still exists for a transducer system of even higher efficiency exhibiting uniform performance over a designated planar surface.

SUMMARY OF THE INVENTION

The objective of the invention is to produce a radiant energy transducer system having a tailored intensity characteristic over a desired footprint or field of view.

Another objective is to maintain a relatively high efficiency of the transducer characteristic over the footprint or field of view.

One more specific objective is to provide a transducer having a planar uniformity of response or illumination over a desired footprint.

The inventive concepts involve a series of 'tailoring' techniques, which enable the system designer to adapt a transducer system to a specific illumination or detection application requiring a particular performance. One of these techniques utilizes the principles of constructive occlusion, with selection of the optical parameters of the constructive occlusion system, to satisfy the performance demands of the particular application. Constructive occlusion utilizes a mask sized and positioned to occlude a substantial portion of an active optical area, such as an aperture of a diffusely reflective cavity, in such a manner as to provide the desired performance characteristic.

Constructive occlusion of this type may be used alone or in combination with several other techniques. One additional mechanism used to further tailor performance involves a non-diffuse reflective shoulder (specular or retro-reflective) around a peripheral section of the mask and cavity type transducer system. Another technique involves using a retro-reflector along a portion of the periphery of the system, to limit the angular field of view and to redirect certain light back into the system for further optical processing.

Another technique, used with a mask and cavity type constructive occlusion system, involves use of one or more reflective walls along one side of the system. The reflective walls limit the field of view to angles on the opposite side of the axis or plane of the walls.

These techniques enable a system designer to adapt the transducer system to a wide range of applications. A lighting system, for example, may uniformly illuminate a distant planar surface, such as a desktop or a section of a floor or ceiling. The resulting transducer systems are relatively simple in structure, making them easy to manufacture and rugged.

The present invention uses materials having a variety of different types of types of reflectivity. Recall for example that a material providing a diffuse reflectivity reflects light, impacting at an incident angle to the surface, over a range of angles of reflection, i.e. in many different directions. A material providing a specular reflectivity reflects light impacting at an incident angle to the surface in a new direction, but the angle of reflection relative to the surface equals the angle of incidence. A material or surface providing a retro-reflectivity reflects light back along the same path on which it arrived or on a closely parallel path.

In one aspect, the invention relates to a radiant energy transducing system. This system comprises a base, a mask and an electromagnetic transducer. The base has a diffuse active optical area. The mask is spaced from the base and positioned to occlude a portion of the active optical area. The transducer provides a conversion between radiation associated with the active optical area and corresponding electrical signals. The mask has a size in relation to the active optical area and is spaced a distance from the active optical area such that the system exhibits a predetermined performance characteristic over a field of view.

In this first aspect, the system further includes a shoulder adjacent to and extending outward from a peripheral section of the active optical area. The shoulder has a surface facing the field of view, and the shoulder surface has a non-diffuse reflective characteristic. Disclosed examples utilize a specular shoulder surface or a retro-reflective shoulder surface.

Examples of such a system disclosed in detail below utilize transducers which may be sources emitting radiant energy or use transducers which may be sensors/detectors for converting received radiant energy to electrical signals. In many of the preferred embodiments, the active optical area relates to the aperture of a diffusely reflective cavity. The cavity may be formed in the base or the mask. If in the base, for example, the periphery of the aperture defines the active area. If formed in the mask surface facing the base, the reflection of the aperture onto the base may be considered as the active area. The transducer is coupled to process radiant energy within the cavity and the associated active area, for example, to emit light through a fiber into the cavity for emission via the aperture.

In a mask and cavity type transducer system in accord with this aspect of the invention, the mask height above the aperture and the relationship of the size of the mask to the size of the aperture are the principal factors effecting the sensitivity or illumination intensity distribution within the field of view or over the desired footprint area. The shape of the mask and aperture also has have some impact on distribution. The shape of the aperture and the shape of the corresponding mask are the principal factors effecting the shape of the field of view or footprint, although mask height and the relative sizes of the mask and aperture may have some impact. The width of the shoulder and the particular reflectivity effect the performance characteristics in certain sections of the field of view.

In another aspect, the invention relates to a radiant energy transducing system including a base, a mask, a transducer and a retro-reflective ring. The base, mask and transducer in this system are essentially similar to those discussed above relative to the first aspect of the invention. Some embodiments include a shoulder adjacent to and extending outward from a peripheral section of the active optical area. The ring, in this system, is located along a periphery of this shoulder. The ring extends from the shoulder toward the field of view. Alternative embodiments locate a retro-reflector at other positions around the system for example, opposite the base and across the system axis. The retro-reflector or ring serves to limit the field of view. The retro-reflective surface faces toward the mask and the active optical area, for reflecting radiant energy diffused from those elements at angles outside the field of view back toward the mask and optical area, for further optical processing.

The shape of the wall of the retro-reflector also may be selected to facilitate a particular application. The retro-reflector, for example, may extend straight out from the shoulder or other wall. Other embodiments of the retro-reflector may curve, bend or slant inward toward the axis of the system. Such wall shapes enable the retro-reflector to limit the angle of view as desired with less height out from the shoulder, when compared to the straight wall. These shapes also provide a lesser angle of incidence of light on the retro-reflective surface of the wall, which enables the use of retro-reflective materials, such as retro-reflective paints or tapes, which may have a smaller angle of acceptance. For other applications, it may be desirable to angle the retro-reflector outwards, away from the other system elements.

The principles of the retro-reflector may have application separate and apart from their use with constructive occlusion. Thus, another aspect of the invention relates to a system for emitting radiant energy, comprising a source, a distributor and a retro-reflector. The distributor is coupled to the radiant energy source, for distributing the radiant energy from the source with a desired intensity distribution pattern. The retro-reflector is spaced a predetermined distance from the distributor and positioned to reflect a portion the radiant energy from the distributor, that would be outside of a desired field of view of the system, back to the distributor. This retro-reflection enables distribution of the recycled energy, in the desired distribution pattern, as part of the energy emitted within the desired field of view.

Another aspect of the invention, relating to tailoring of the performance characteristics of a mask and cavity type constructive occlusion transducer system, utilizes a reflective wall to optically 'cut-off' a portion of the system and reflectively image the system to act much like a full symmetrical system if observed from within the field of view.

In this aspect, the invention is a system comprising a base, a mask and a transducer. The base has a diffuse active optical area, which faces substantially toward at least a portion of an intended field of view of the system. A shoulder, adjacent to the periphery of the active optical area, has a reflective surface facing the field of view. The mask is spaced from the base and positioned to occlude a portion of the active optical area of the base. The mask has a reflective surface facing substantially toward the active optical area of the base. In this aspect of the invention, the system includes a diffusely reflective cavity. Specific embodiments are disclosed with the cavity formed in the active optical area of the base, for example, so that the aperture of the cavity defines the active optical area. Other specific embodiments have the cavity formed in the facing surface of the mask.

Systems in accord with this aspect of the invention also include a reflective wall, which extends from a side of the cavity substantially to an edge of the other one of the active optical area of the base and the surface of the mask. For example, if the cavity is in the base, this wall extends to the facing surface of the mask. If the cavity resides in the mask, the wall extends to the active area of the base. Another reflective wall extends from a periphery of the mask away from the base. In some preferred embodiments, these walls actually are coplanar, but in others they are offset, for example at opposite edges of the mask.

The radiant energy transducer provides conversion between radiation associated with the active optical area and corresponding electrical signals. The mask has a size in relation to the active optical area and is spaced a distance from the active optical area such that the system exhibits a predetermined performance characteristic with respect to the radiant energy over the intended field of view.

The reflective walls substantially limit the field of view to one side of the axis of the aperture. Considered another way, however, these walls serve to substantially form a mirror image of the system components. Consequently, the system exhibits a performance to one side of the walls in a manner similar to an entirely symmetrical system, but with substantially increased performance over the limited field of operation.

A variety of different system embodiments may utilize the 'cut-off' technique alone or in combination with other tailoring techniques disclosed herein. For example, a cut-off system may have a specular shoulder. Also, the cut-off system may include a retro-reflector. The retro-reflector may be along a periphery of the shoulder. In one embodiment, however, the retro-reflector is along a periphery of one of the reflective walls, preferably opposite the cavity formed in the base.

The transducer systems of the invention can provide a wide range of performance characteristics, to meet the demands of different applications. These systems, for example, can provide emission or response characteristics that are substantially uniform with respect to angle relative to the system axis, over a range of angles. A number of significant applications, particularly for radiation emission systems, provide uniform performance over a planar footprint.

Thus, another inventive concept relates to a radiant energy emission system providing planar uniformity. This system includes a radiant energy source, a base and a mask. In this case, the base has a diffusely reflective active optical area, for reflecting and diffusing the radiant energy. The source is optically coupled to the active optical area of the base. The mask is spaced from the base and positioned so as to occlude a portion of the active optical area. The configuration of the base and the mask produces an illumination over a predetermined planar footprint. The size and positional relationship of the mask to the active area results in a substantially uniform illumination over the planar footprint.

The transducer system providing planar uniformity can incorporate various combinations of the other features described above, to improve efficiency and/or to tailor the field of view. For example, the system may include a specular shoulder area and/or a retro-reflective ring. Another disclosed embodiment providing planar uniformity utilizes the specular reflective wall, to limit the field of view or footprint to one side of the system. This later system may be mounted with that wall against a flat surface, such as a building wall or ceiling, to illuminate a plane perpendicular to the flat surface.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

FIG. 15D is a side cross-sectional view of the system of FIG. 15A.

FIG. 16A is a cross-sectional view of another embodiment, which is similar to that of FIGS. 12A to 12C but with the cavity formed in the mask.

FIG. 16B is a front elevational view of one embodiment of a system corresponding to the cross-section of FIG. 16A, having a mask and cavity formed from a segment of a sphere and having a semi-circular aperture.

FIG. 16C is a front elevational view of alternative embodiment of a system corresponding to the cross-section of FIG. 16A, having a mask and cavity formed from a segment of a cylinder and having a rectangular aperture.

FIG. 17 is an end view of a practical embodiment of a system operating in accord with the principles exemplified in FIGS. 16A and 16C.

DETAILED DESCRIPTION OF THE PRESENTLY PREFERRED EMBODIMENTS

The present invention utilizes principles of constructive occlusion alone or in combination with other techniques, such as a reflective shoulder, to tailor the illumination distribution or the sensitivity profile of a radiant energy transducer system. The invention also contemplates using a retro-reflector along a portion of the periphery of the system to tailor system performance. The retro-reflector may be used alone or in combination with constructive occlusion.

Another performance tailoring technique in accord with the invention involves use of one or more reflective walls to optically 'cut-off' a constructive occlusion type mask and cavity system and thereby produce a sharp drop off in performance on the cut-off side of the system axis. The reflectivity of these walls extends from a low surface point within the cavity, past the aperture and mask to a point substantially beyond the mask.

The tailoring techniques of the present invention may produce any desired shape of footprint, e.g. circular, rectangular or square. The inventive techniques also enable tailoring of a system performance characteristic to achieve a desired power density or detector sensitivity over the desired footprint. The density distribution, for example, may be uniform over a planar footprint. The plane of the footprint often is perpendicular to the axis of the transducer system, but the plane may be at an angle with respect to that axis. The density distribution may be angularly uniform or may vary in a desired pattern over some range of angles or over the surface area of the desired footprint. Several embodiments of the invention produce a distribution that is substantially uniform over a planar footprint.

Essentially, the tailoring techniques allow the designer to reduce the amount of energy necessary to achieve a particular lighting goal or detector sensitivity. For example, in an illuminating application, the techniques of the invention maximize the amount of generated light directed into the desired field of view or onto the desired footprint. Light outside the desired region is effectively minimized. This maximizes efficiency. For a given power, the illumination over the footprint is brighter. Alternatively, the same brightness in the desired region may be achieved with a lower power.

To understand the concepts of the present invention, it may be helpful to begin by considering some simple examples.

Figure 1:
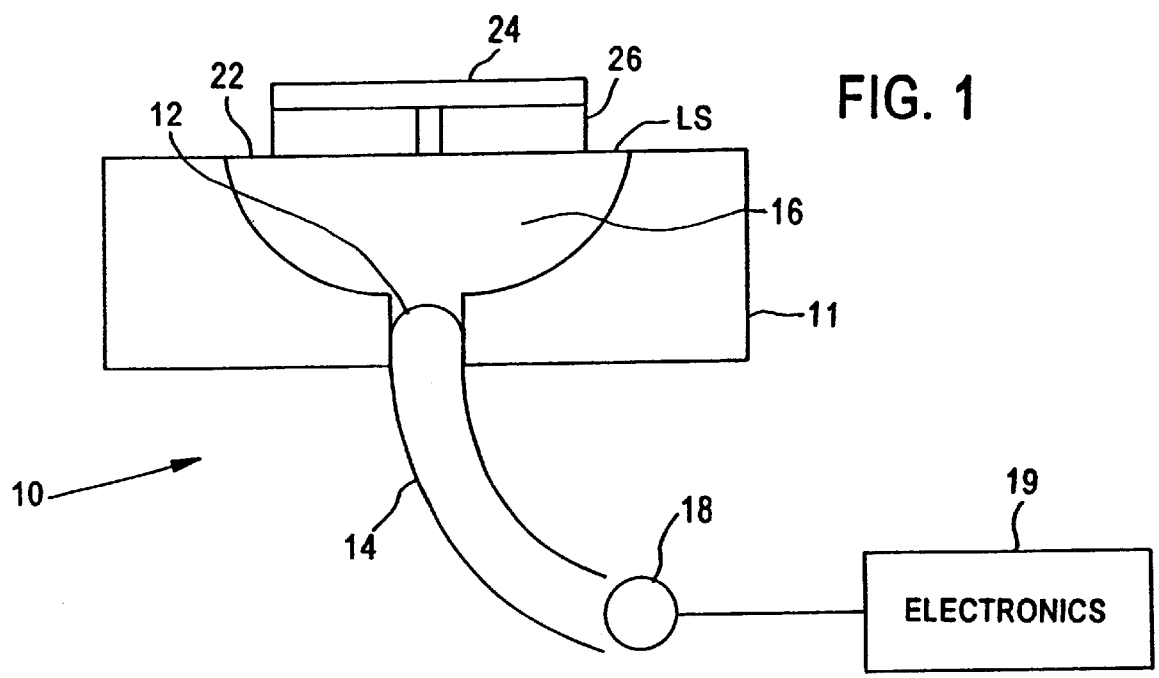
FIG. 1 is a cross-sectional view of a simplified example of a transducer system utilizing principles of constructive occlusion, in accord with the invention.

FIG. 1 shows a transducer system 10 in accord with the invention. As illustrated, the system 10 comprises a base 11 having an active area, a transducer shown as a point transducer 12, and a mask 24 occluding a portion of the active area of the base.

The transducer comprises an actual transducer element that is optically coupled to the active area of the system 10. The systems in accord with the invention utilize a variety of different transducers for different applications. The example of FIG. 1 utilizes a point transducer 12. The point transducer could be an element within the cavity 16. The illustrated point transducer 12 comprises an optical fiber 14, which optically couples the actual transducer element 18 to a point in a cavity 16 formed in the base 11. Other transducers may be substituted for the point transducer 12.

As noted, in the example of in FIG. 1, an optical fiber 14 connects the optical portion of the transducer element 18 to an opening in the cavity 16. As shown by later examples, the transducer element may be coupled to the optical active area in any manner that is convenient or efficient in a particular type of application.

The actual transducer element 18 may be a radiation source or emitter, such as a light emitting diode (LED) or some type of lamp or light bulb. The source may emit visible light, ultraviolet light, infrared or other types of radiant energy. Alternatively, the transducer element 18 may be an energy detector, providing radiant energy-to-electrical signal conversion for energy in a wavelength range of particular interest. Examples of such detectors include photodiodes, phototransistors, and the like. The detector may sense visible light, ultraviolet light, infrared or other types of radiant energy.

The optical fiber 14 provides optical coupling of the cavity to the actual transducer element 18. The transducer element 18 provides a conversion between radiant energy (e.g. optical energy) and electrical signals. For the electrical signals, the element 18 will typically connect to some associated electronics 19. In a detector embodiment, for example, the fiber 12 carries light from the cavity 16 to one or more photo-detectors serving as transducer element 18.

The photo-detector creates an electrical signal in response to the light it receives. The element 18 would supply that signal to the electronics 19, for further processing. In a visible-light illumination system, the electronics 19 generate a signal to drive one or more transducers 18 to emit light. Such electronics may be as simple as a plug-in lamp cord, a ballast for a fluorescent light or a drive circuit for an LED or laser diode. The optical fiber 14 transmits the light from the transducer element 18 to the cavity 16, and the diffuse cavity and mask elements process the light to produce the desired distribution of radiant energy.

In the example, the base 11 defines an active area LS that has substantially Lambertian energy distribution properties. In the example and in many preferred embodiments, the Lambertian active area corresponds to the aperture 22 of the diffusely reflective cavity 16 formed in the base 11. As shown in later embodiments, the cavity here could be formed in the ask 24, in which case the aperture forms an optically active area on the mask. A somewhat wider portion on the base then reflects light into or out from that aperture and thereby forms an optically active area on the base (corresponding approximately to the diffuse reflection of the cavity aperture).

In accord with the invention, the mask 24 constructively occludes a portion of the optically active area of the system. In the example of FIG. 1, the mask 24 occludes a substantial portion of the aperture 22 of the diffusely reflective cavity 16, including the portion of the cavity on and about the axis of the system. The relative dimensions of the mask 24 and aperture 22 and the height of the mask 24 above the aperture 22 control the performance characteristics of the transducer system 10. Certain combinations of size and height, for example, result in a system performance that is uniform with respect to a planar surface perpendicular to the system axis at a fixed distance from the aperture.

To better understand the concept of the invention, it may be helpful to consider the example of FIG. 1, when constructed to act as a light emitting or illuminating system, in somewhat more detail.

In a visible-light illumination system, the electronics 19 generate an appropriate signal to drive the transducer 18 to emit light. For example, the electronics 19 may supply a signal to drive an LED serving as element 18. The optical fiber 14 carries the emitted light from the transducer element 18 to the cavity 16. A substantially Lambertian emitting surface LS is created using the point illuminating element 12 that illuminates the cavity 16 whose interior surface is diffusely reflective.

The cavity 16 diffusely reflects the radiation from the point transducer 12 so as to create a uniform illumination through the aperture 22 of the cavity 16, i.e. so that the aperture appears as an emitting surface LS with a Lambertian characteristic. Although further discussion will generally concentrate on the light emitting embodiment, it should be noted that a substantially Lambertian detection surface LS can be created at aperture 22 by using a point detecting element (such as a photo-diode) that detects light within a cavity 16 with a highly efficient diffusely reflective inner surface.

It is desirable that the cavity surface has a highly efficient diffusely reflective characteristic, e.g. a reflectivity of over 99%, in the visible and the near-infrared wavelengths. One example of a material with a suitable reflectivity is SPECTRALON. The base itself may be constructed of the diffuse reflective material, or the inner surface of the cavity 16 may be coated with the diffuse reflective material to achieve the desired reflectivity. Other suitable materials, though typically less effective than the diffuse reflective materials mentioned above, include quasi-diffuse reflective materials, such as flat white paint.

The outer surface of the mask 24, in particular the surface facing the aperture 22, is also constructed of a diffusely reflective material, such as SPECTRALON, so that any light incident on the side of the mask 24 facing the aperture 22 is not emitted but is diffusely reflected back into the cavity 16. The light redirected back into the cavity 16, on average, reflects many times within the space formed by the cavity 16 and adjacent diffusely reflective components.

The base 11, cavity 16 and mask 24 illustrated in cross-section in FIG. 1 are circularly symmetrical so that a cross-section from one point of view is the same as a cross-section from a perpendicular view. Thus, the mask 24 is circular. The aperture 22 of the cavity 16 also is circular. The mask 24 is aligned with the central axis of the cavity 16 and its aperture 22, and the facing surface of the mask 24 is parallel to the plane of the aperture 22. Typically, such a system will illuminate a circular footprint on a planar surface perpendicular to the common central axis of the cavity 16, the aperture 22 and the mask 24.

The cavity 16 illustrated in cross-section is a segment of a sphere and preferably forms a hemispherical cavity; however, the cavity may be any shape. Moreover, the size of the aperture 22 need not be comparable to the maximum cross-sectional area of the cavity; that is, the cavity may be more spherical than hemispherical. Furthermore, the aperture 22 need not be planar. However, the hemispherical cavity with a planar aperture generally is preferred, as it is easier to construct and it affords geometric symmetries that allow the use of simplifying calculations and assumptions in designing the system to meet the requirements of a particular application.

When the cavity 16 is hemispherical (or spherical) and the aperture 22 planar, as shown in FIG. 1, the aperture 22 of the cavity 16 defines a diameter Da and the mask defines a diameter DM. The ratio between the diameters DM and Da (or between the corresponding radii) is a parameter that can change the profile (radiation or response) over the footprint or field of view of the transducer system 10 as discussed in more detail later.

The exemplary embodiment shown in FIG. 1 also includes a diffusely reflective baffle 26. The baffle, in the example, may take the form of a symmetrical cross or T, dividing the circular region between the mask 24 and the aperture 22 into four substantially equal quadrants. Other baffle structures are encompassed by the concepts of the invention. The baffle deflects some of the light in the region between the mask and cavity out substantially toward the horizon of the system 10 (at or about 90° with respect to the central axis of the system). In that sense, the baffle serves to extend the field of view or the diameter of the footprint. For convenience of illustration, elements for supporting the mask and baffle in the positions shown have been omitted from the drawings.

Figure 2:
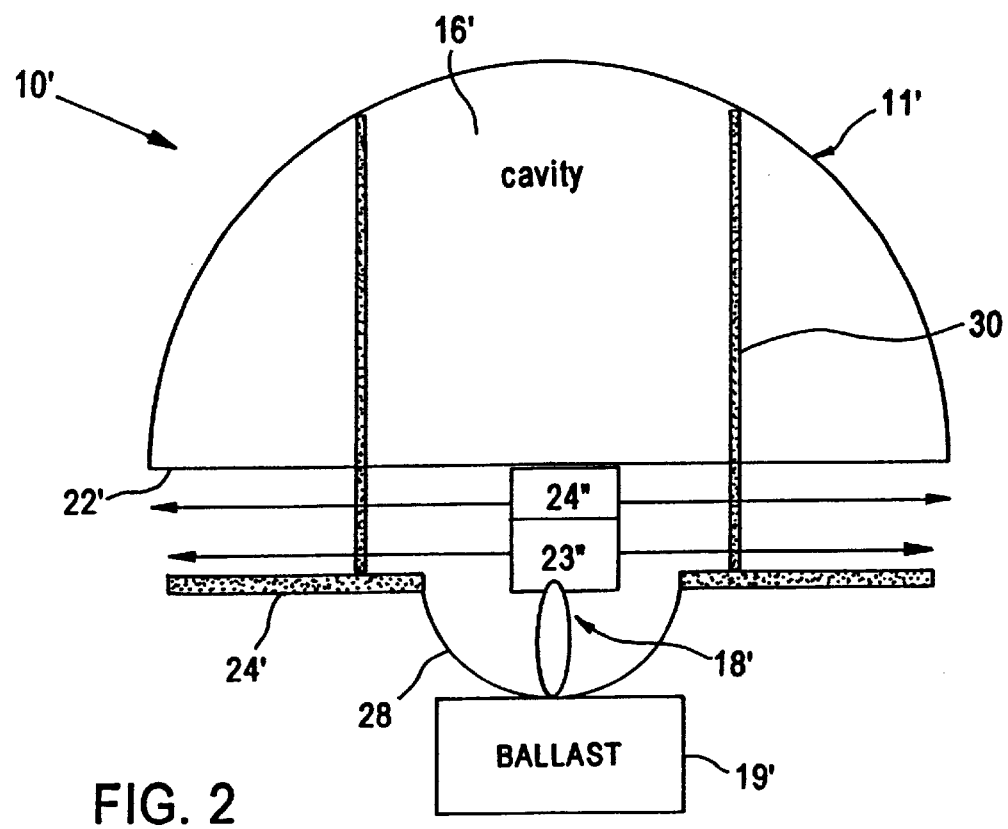
FIG. 2 is a cross-sectional view of a lighting fixture providing planar uniformity, in accord with the invention.

FIG. 2 is a practical example of a lighting fixture 10' embodying the concepts discussed above relative to FIG. 1. The fixture of FIG. 2 might be mounted in the orientation shown on top of a pole or the like, so as to provide a uniform lighting footprint over a planar surface below the fixture. In this embodiment, a dome forms the base 11', and the inner surface of the dome serves as the cavity 16' of the fixture. At least the interior surface of the cavity 16' is formed of a diffusely reflective material, such as SPECTRALON.

The shape of the dome 11' defines the shape of the cavity 16' and the aperture 22'. A variety of shapes could be used depending on the particular lighting application that the system 10' will serve. For example, the dome could take the form of a half-cylinder or half of an oblate spheroid. In the example, the dome 11' is approximately hemispherical.

The mask 24' is below the aperture 22' of the cavity 16' when the system 10' is oriented in the manner shown. The flat surface of the mask 24', which faces toward the aperture 22' of the cavity, is formed of a diffusely reflective material, such as SPECTRALON. In this embodiment, the transducer element 18' is a light bulb illuminated by electrical energy supplied from a ballast 19'. The mask 24' incorporates a reflector 28 surrounding the light bulb 18', to efficiently project the radiant energy from the bulb 18' into the diffusely reflective cavity 16'.

The inner surface of the reflector 28 may have a specular reflective characteristic but preferably is diffusely reflective.

The system 10' also includes one or more elements to physically support the dome 11' in the position shown above the mask 24' and the light bulb 18'. Examples of such elements are shown schematically as stanchions 30 in FIG. 2.

An actual design providing planar uniformity in accord with FIG. 2 uses a hemispherical dome 11' providing a twenty-four inch diameter cavity aperture 22', a round mask 24' having a twenty-three inch diameter and a 400 watt clear light bulb 18'. The ratio of mask diameter to aperture diameter is about 0.95. Examples of constructive occlusion systems exhibiting planar uniformity have been constructed with mask height to aperture radius ratios at or around 0.6.

The example of FIG. 2 produces a highly uniform illumination over a flat planar surface at a distance below the system 10' and perpendicular to the central axis of the dome, aperture and mask. Assuming that the cavity 16', the aperture 22' and the mask 24' all are circular, the illuminated footprint also is circular. However, modifying the shapes and positional relationships of the components of the systems of FIGS. 1 and 2 changes the footprint shape and the performance characteristic over the footprint or over the field of view of the system. This enables the designer to 'tailor' a system to a particular application. To understand the significance of the tailoring capability, it may be helpful to discuss system performance parameters in somewhat more detail.

Figure 3:
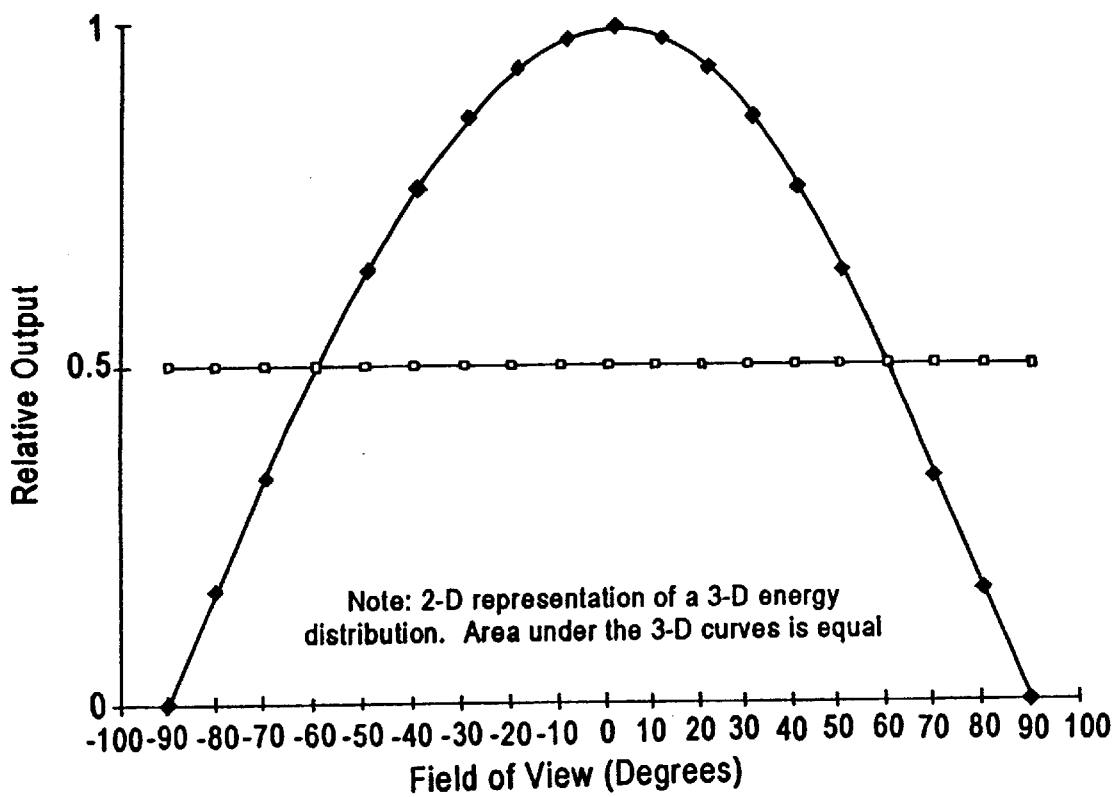
FIG. 3 is a distribution graph of lighting energy versus angle, providing a comparison between a cosine dependent transducer system and a system using constructive occlusion to achieve angular uniformity.

Consider the distribution curves shown in FIG. 3. The curves represent distribution of radiation from a lighting system over a range of angles. By contrast, a radiation detector system would exhibit a sensitivity curve over a range of angles defining the field of view, although the shape of the performance curve may be approximately the same for an emitter and a detector having similar structures. The curves for the two types of systems, illumination systems and detector systems, may be similarly tailored in accord with the invention. For simplicity of discussion, however, the graphs and discussions thereof emphasize exemplary systems for illumination.

A traditional light source typically produces a cosine distribution curve, such as shown by the curve with points marked by dots in FIG. 3. Over its field of view, such a light source provides a peek illumination along the central axis at 0°, corresponding to the central axis of the system. The illumination intensity remains high at angles close to the 0° axis. However, the illumination drops off from the peek to zero as the angle widens toward the horizons, i.e. 90° off the central axis. With such a source, to achieve a relative output of 0.5 of maximum at angles ±60° from the central axis results in excess power illumination in and around the central axis. To increase the illumination at the ±60° angles or to increase the angle of view to illuminate a wider range to the same level would require an increase in power with a still further increase in the intensity on and around the central axis, which would be unnecessary.

Tailoring the illumination in accord with the concepts of the invention, however, enables redistribution of a portion of the light initially emitted along the central axis out into off-axis regions. For example, an ideal light distributor built in the accord with the invention might produce a distribution similar to the line having the points indicated by squares, in FIG. 3. In such a system, the distributor illuminates an area almost from horizon to horizon with a substantially uniform intensity. There is no excess power in the angular region near the axis. In many applications, the light distributor designed in accord with the invention can meet a specified illumination over the desired field of view with a lower drive power.

The tailoring techniques of the present invention may produce any of a variety of illumination intensity or detector sensitivity distributions. Certain preferred embodiments produce uniform distributions. Two types of uniform distributions, alluded to earlier, are particularly significant and merit a more detailed discussion here.

The first type of uniformity, angular uniformity, means that at a fixed radial distance from the transducer system, the light intensity or sensitivity of the transducer to light is substantially the same over a range of angles. For example, at points one meter from a light distributor system, the intensity is the same over angles from near −90° to near +90°. A graph of the distribution of intensity/sensitivity with respect to angle would resemble or approach a line. The line indicated by the square points in the graph of FIG. 3 represents an ideal angularly uniform distribution.

Figure 4:
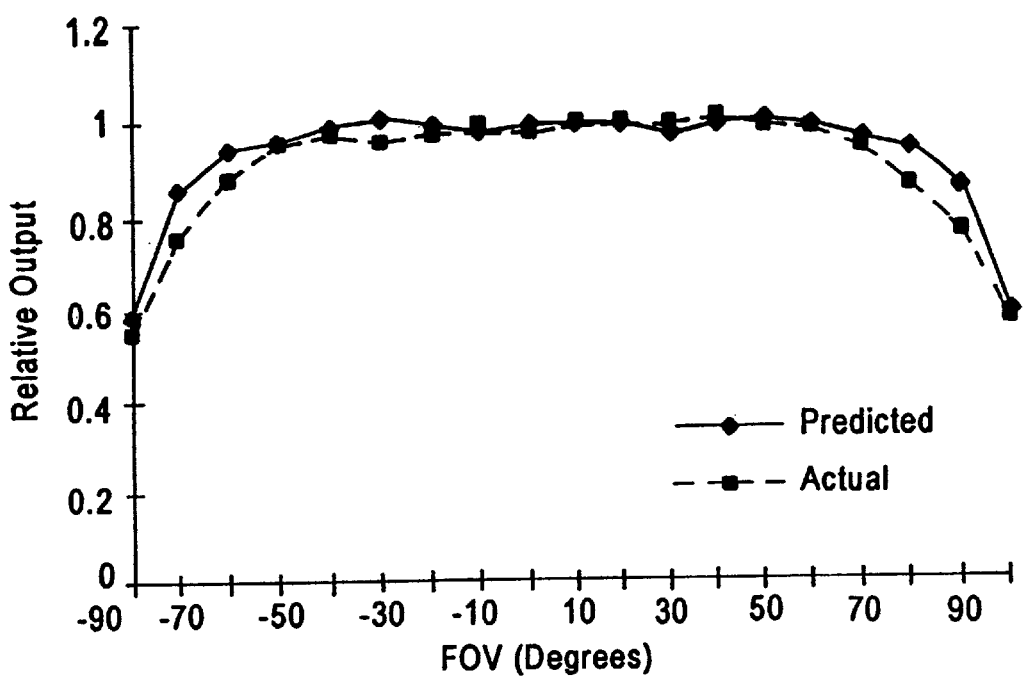
FIG. 4 is a distribution graph of lighting energy versus angle, showing predicted and required results for a light distributor system using constructive occlusion to achieve angular uniformity.

FIG. 4 illustrates actual and predicted intensity distributions, for a light distributor designed in accord with the invention to produce an angularly uniform intensity distribution. Of particular note, the curves are substantially flat over an extended range of angles about the axis, with some drop off near the outer angular regions.

The second type of uniformity is planar uniformity. For a radiation emitting system, in our example, planar uniformity means that a plane at some distance and angle relative to the transducer system is substantially uniformly illuminated over a desired footprint area or produces a substantially uniform sensitivity in the transducer system over the planar footprint area. Different systems may have uniform distributions with respect to planes at different locations and orientations relative to the transducer system. A typical type of uniformity is over a plane, a predetermined point of which coincides with the axis of the transducer system, and which is perpendicular to that axis, at a fixed distanced from the system. For such a uniform distribution, a light distributor substantially uniformly illuminates a desired footprint area on the planar surface.

For example, a light source 2 meters above a flat surface would uniformly illuminate a desired footprint (circle, rectangle or square) on the flat surface. Similarly, a light detector is substantially uniformly sensitive to light received from points within the desired footprint on the plane.

For a constructive occlusion type system to produce planar uniformity, the ratio of mask height to aperture radius may be 0.60±0.05. With this ratio of mask height to aperture radius, the ratio of mask diameter to aperture diameter (or mask radius to aperture radius) typically is around 0.95. If the ratio of the diameters (or radii) goes down, for example to 0.90, the ratio of height to aperture radius must go up, for example to 0.90, in order to maintain the desired planar uniformity.

Figure 5A:
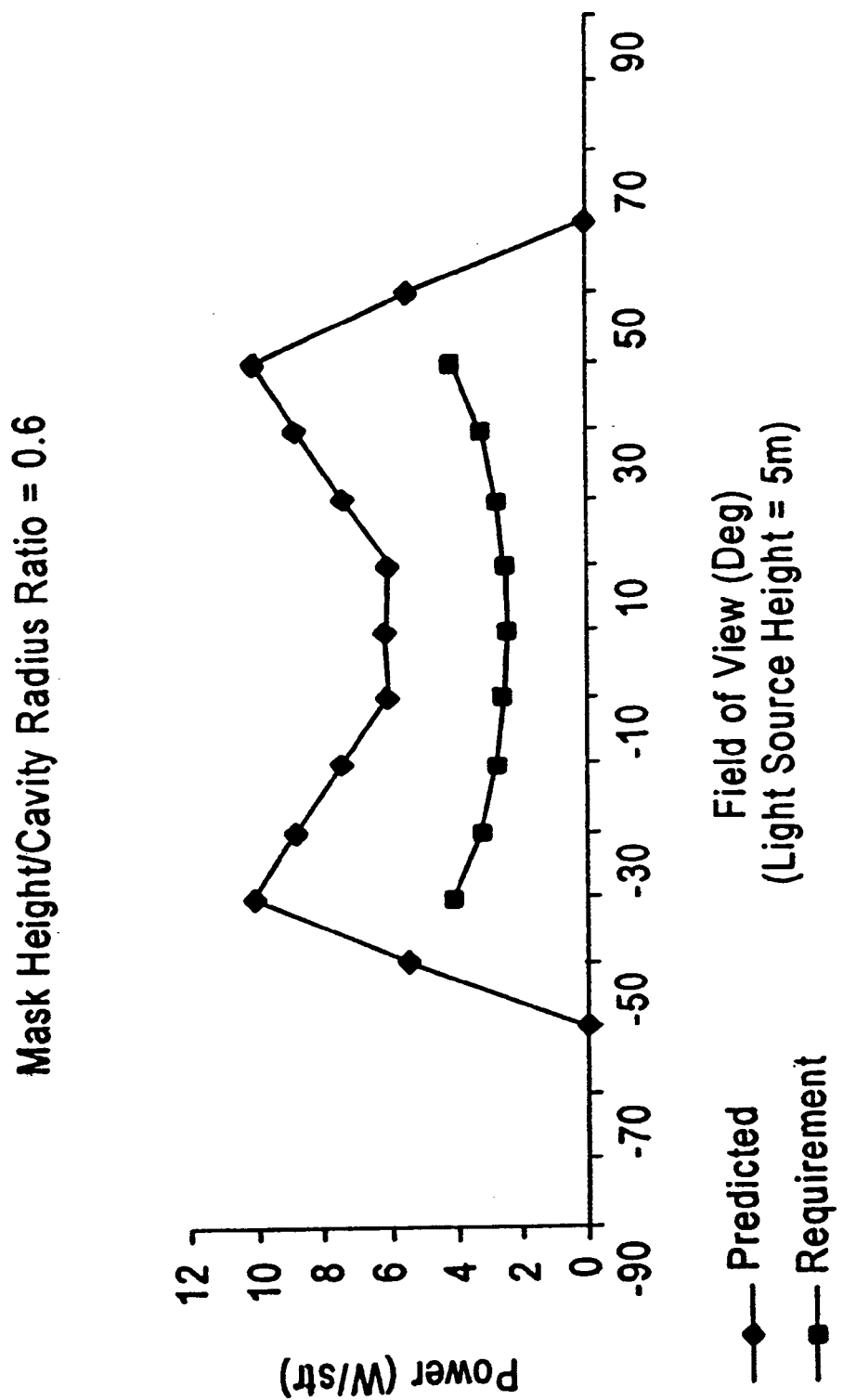
FIG. 5A is a distribution graph of lighting energy versus angle, showing predicted and actual results for a light distributor system using constructive occlusion to achieve planar uniformity.

FIGS. 3 and 4, as discussed above, illustrate ideal, predicted and actual illumination intensity distributions for transducer systems designed for angular uniformity. The angular uniformity requires distribution curves having substantially flat regions. To provide the planar uniformity over a desired footprint perpendicular to the axis, however, requires a higher light intensity at angles further out from the axis of the transducer system. Thus, such a planar uniformity requires a U-shaped distribution, where intensity or sensitivity is analyzed with respect to angle. FIG. 5A illustrates a specification requirement for a lighting transducer system (curve with darkened square points) and a predicted intensity distribution for an illumination system designed to meet this requirement (curve with darkened diamond points).

Figure 5B:
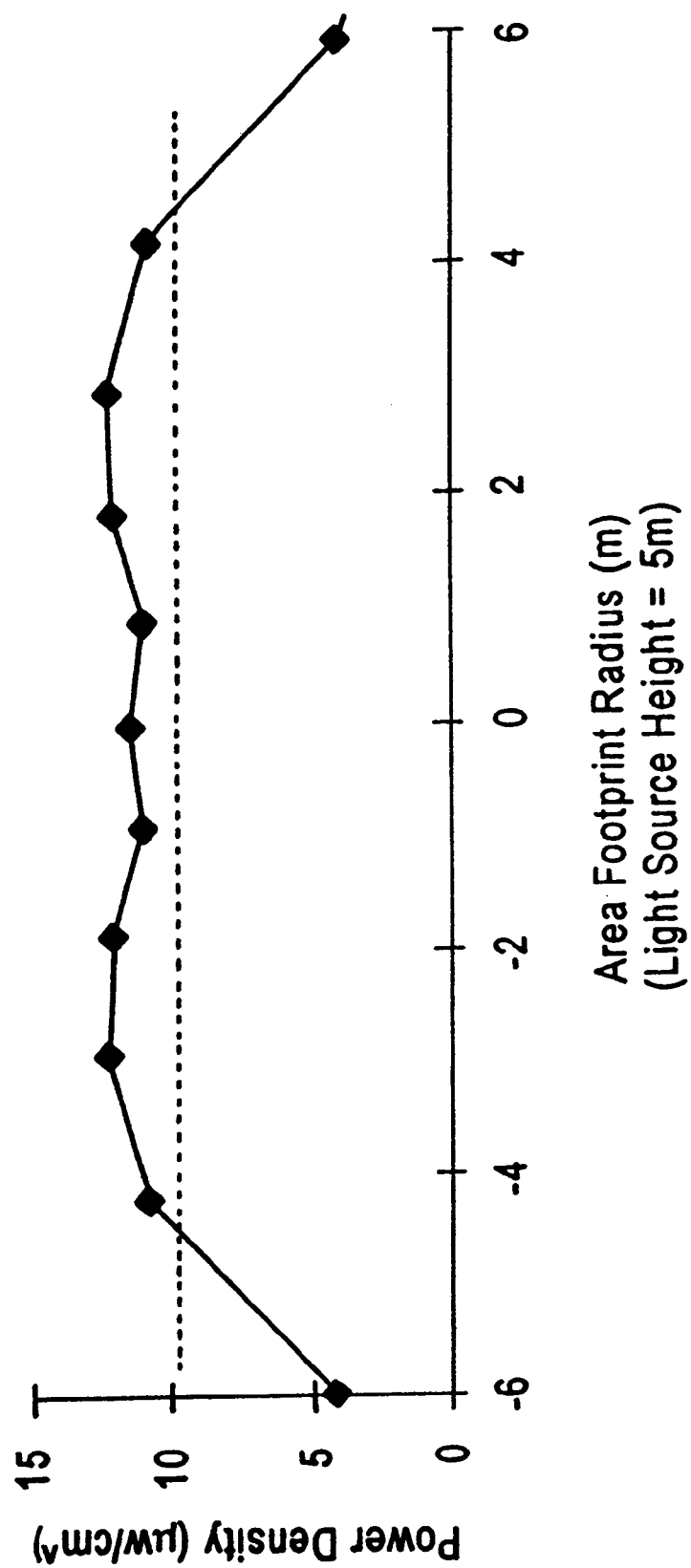
FIG. 5B is an energy distribution graph of lighting energy versus distance from the center of the lighting footprint, showing a substantially uniform distribution over a circular, planar footprint.

FIG. 5B shows the distribution for the same system, producing planar uniformity, but as a function of the distance from the center of the footprint (curve with solid diamond points). As shown, the energy distribution is substantially flat over a substantial region about the center of the footprint and falls off somewhat toward the edges of the footprint. However, within some specified tolerance, the distribution is uniform over a wide radial distance and approximates the ideal planar uniformity represented by the horizontal dotted line in FIG. 5B.

The angular and planar 'uniformity' levels fall within some specified tolerance level within the angular field of view or over the footprint on the planar surface. A typical tolerance level for acceptable uniformity is ±5% over the field of view, over the planar footprint, or over the other range of the uniformity.

By adjusting the height of the mask above the aperture, by adjusting the size of the mask relative to the aperture, and by selecting the shape of the cavity and mask, it is possible to adjust or tailor the power output curve of an emitting system or to adjust the sensitivity curve of a detector system. Varying these design elements also enables tailoring of the sensitivity or illumination footprint on a target surface.

A constructive occlusion type transducer system, with a circular mask and cavity, typically exhibits a circular footprint on a surface facing the aperture of the cavity, as discussed above relative to FIG. 2. A half-cylindrical shaped cavity with a rectangular aperture together with a rectangular mask (FIGS. 8A–8C, to be discussed later), for example, produce a rectangular distribution on the facing planar surface. The relationships of the rectangular mask to the rectangular aperture (height and sizing) are then adjusted to produce the desired distribution within the footprint, e.g. angular distribution or distribution over a planar surface.

Consider an illuminating system as a representative example. For a given ratio of mask radius to aperture radius (or length and width), moving the mask farther away from the aperture (creating a larger ratio of height to aperture radius) effectively moves more energy out from the axis. Thus, the increase in the ratio of height to aperture radius also decreases the intensity of on-axis illumination. Conversely, moving the mask closer to the aperture (smaller ratio of height to aperture radius) provides more radiation energy on or about the axis of the system. Thus, a decrease in the ratio of height to aperture radius increases the intensity of on-axis illumination.

For a given mask height, a larger mask in relation to the size of the aperture (increasing ratio of mask radius to cavity radius) effectively forces more of the radiation energy out in the regions away from the transducer system axis. The use of a larger mask therefore decreases on-axis distribution. Conversely, a smaller mask in relation to the size of the aperture (decreasing ratio of mask radius to cavity radius) effectively allows emission of more energy in areas on or about the axis. The use of a smaller mask therefore increases on-axis distribution.

Generally, changing the size of the optic will not affect performance as long as the ratios remain constant.

The shape of the aperture and the shape of the corresponding mask are the principal factors effecting the shape of the field of view or footprint, although mask height and the relative sizes of the mask and aperture may have some impact.

Conversely, the mask height above the aperture and the relationship of the size of the mask to the size of the aperture are the principal factors effecting the sensitivity or illumination intensity distribution within the field of view or footprint area. However, the shape of the mask and aperture does have some impact on distribution. For example, a circular aperture and mask can easily achieve an angular uniformity over a hemispherical field of view. However, a triangular or rectangular aperture and mask will not normally be able to provide angular uniformity over a hemisphere. In contrast, a transducer with a circular or rectangular aperture and mask can produce planar or angular uniformity over a corresponding footprint shape. The difference in performance in the later types of transducer systems depends on differences in the height or size ratio and/or the addition of other elements to further tailor the distribution as discussed in detail below.

To improve the efficiency of a transducer system over its intended field of view and to further tailor the performance characteristics of the system, the present invention encompasses additional radiation manipulation techniques. One such technique involves the use of specified types of low-diffusion reflectivity on a shoulder about the cavity. The non-diffuse reflectivity could provide a retro-reflectivity, but in several examples discussed below, the reflective shoulder has a specular reflectivity. Another technique for enhancing and tailoring performance involves the use of a retro-reflector around a portion or all of the periphery of the transducer system.

Figure 6:
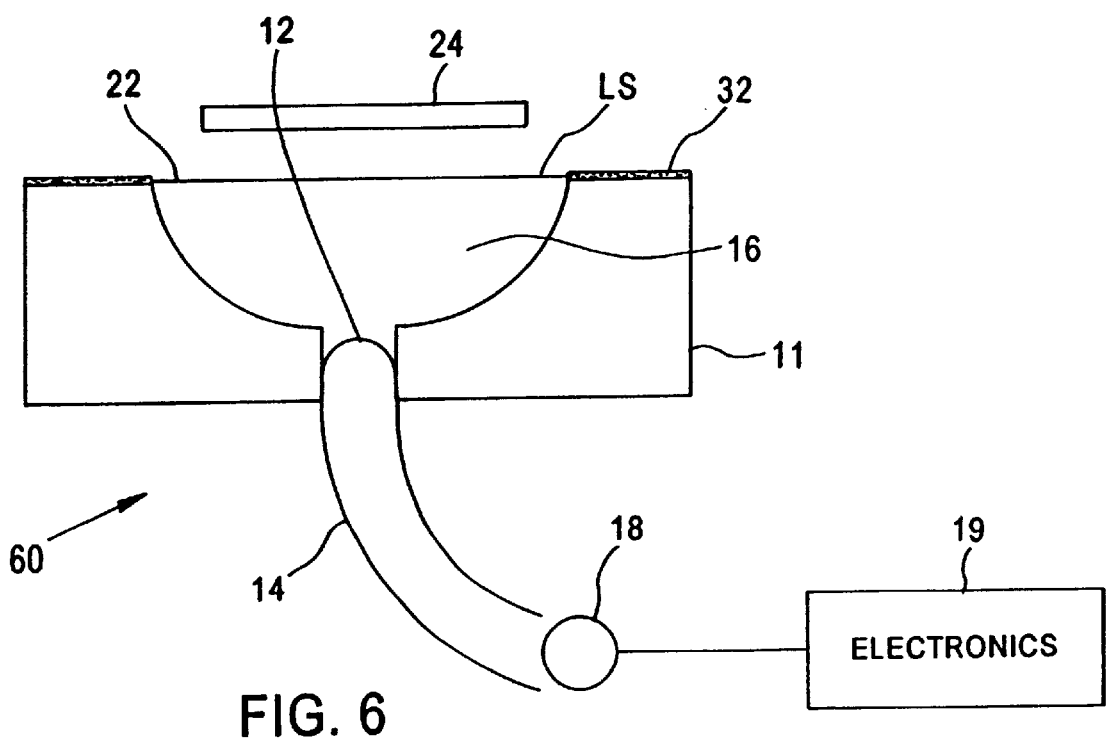
FIG. 6 is a cross-sectional view of a transducer system similar to FIG. 1 but utilizing a specular reflective shoulder to further tailor the performance characteristic thereof, in accord with the invention.

Consider first the transducer system 60 of FIG. 6, in order to understand the effects of the reflective shoulder. The system 60 of FIG. 6 does not include a baffle between the mask and the aperture. Otherwise, the structure and operation of the constructive occlusion elements of the transducer system 60 are generally the same as those of the system 10 of FIG. 1, and like reference numerals have been used to indicate corresponding system elements.

The system 60, however, does include a reflective surface 32. The surface is formed on the shoulder portion of the base 11, between the edge of the aperture 22 and the outer edge of the base. In this embodiment, the surface 32 preferably has a specular reflective characteristic. The specular surface 32 preferably surrounds the aperture 22 on all sides. The shoulder may be flat and coplanar with the active area of the base, or the shoulder may be angled or somewhat curved relative to that area.

Recall that a diffuse reflector reflects a beam of light incident from one direction out in all directions. Most diffuse reflectors appear as bright, white surfaces. A specular reflector has a mirror-like finish. The more mirror-like, the more specular the reflectivity. A beam of light reflects off a specular surface as a beam traveling in a different direction, but the magnitude of the angle of the reflected beam relative to the specular surface is the same as the magnitude of the angle of the incident beam to the surface. The specular surface 32 on the shoulder may take the form of polished aluminum, or the specular shoulder 32 may comprise layers or coatings of silver and glass formed on the base 11, which serves as a rigid substrate. Other known specular materials may be used. The degree of specularity may range from a quasi-specular characteristic to a highly specular characteristic, such as a mirror-like finish.

As in the embodiment of FIG. 1, the system 60 comprises a base 11 having an active area LS, a transducer shown as a point transducer 12, and a mask 24 occluding a portion of the active area of the base. The transducer 12 comprises an actual transducer element 18 that is optically coupled to the active area LS of the system 10 through the optical fiber 14. The actual transducer element 18 connects to electronics 19. The transducer system 60 may be a detector, in which case, the transducer 18 is an optical to electrical converter or sensor, and the electronics 19 process the signal(s) from the sensor.

For purposes of further discussion, however, assume that the system 60 is a radiation system, preferably for illuminating an area with visible light. In such a case, the actual transducer element 18 is a lamp or light bulb, and the electronics 19 generate an appropriate drive current to drive the lamp 18 to emit visible light. The optical fiber 14 couples the light from the lamp 18 into the cavity 16.

In this example also, the aperture 22 of the cavity 16 forms the optically active area on the base 11, and that area LS has substantially Lambertian energy distribution properties. Preferably, the cavity surface has a highly efficient diffusely reflective characteristic, e.g. a reflectivity of over 99%, in the visible and the near-infrared wavelengths. The facing surface of the mask 24 has a similar diffuse reflectivity. The cavity 16 and the mask 24 repeatedly diffusely reflect radiation from the point element 12, so as to create a uniform illumination through the aperture 22 of the cavity 16.

The mask 24 preferably has a diffusely reflective surface, on the side facing the aperture 22 and on its other external surfaces. The mask 24 is positioned to constructively occlude a portion of the optically active area LS of the system. The light redirected back into the cavity 16, on average, reflects many times within the space formed by the cavity 16 and the mask 24.

The base 11, cavity 16 and mask 24 illustrated in cross-section in FIG. 6 are circularly symmetrical so that a cross-section from one point of view is the same as a cross-section from a perpendicular view. Thus, the mask 24 is circular. The aperture 22 of the cavity 16 also is circular. The mask 24 is aligned with the central axis of the cavity 16 and its aperture 22, and the facing surface of the mask 24 is parallel to the plane of the aperture 22. Typically, such a system will illuminate a circular footprint on a planar surface perpendicular to the common central axis of the cavity 16, the aperture 22 and the mask 24.

As discussed above, depending on the dimensions and position of the mask relative to the aperture, the source, mask and cavity emit light with a tailored distribution that may be uniform over a wide range of angles or uniform over a desired footprint, preferably a planar footprint. However, some of the light redirected by the surface of the mask 24 facing toward the aperture 22 of the cavity 16 will have an angle that makes the light impact on the shoulder area surrounding the aperture. As noted, the system 60 includes a specular surface area 32 formed on this shoulder.

The specular shoulder 32 increases the intensity of light emitted into regions of the field of view that correspond to angles relatively far out from the system axis. To understand this principle, it may be helpful to discuss the effects of different types of reflection by the shoulder in somewhat more detail.

Light reflected off a diffusely reflective shoulder, such as used in the prior constructive occlusion applications, has approximately a cosine distribution with respect to the axis of the system. The dimensions and position of the mask relative to the cavity may be adjusted so that the mask and cavity (with no shoulder) would produce a moderately low intensity in angles about the axis of the mask and cavity, with higher intensity in angular regions further out from the axis. The combination of such a mask and cavity with a diffusely reflective shoulder produces a distribution which is relatively uniform with respect to angles, over a range of angles, but with some drop-off at angles approaching 90° relative to the axis. The performance characteristics of such a system would appear similar to the distributions shown in FIG. 4, although the drop-off may occur at somewhat smaller angles relative to the system axis.

When considered alone, a mask and cavity can be designed to produce a similar distribution without any shoulder, by selecting an appropriate ratio for the mask height to aperture radius and an appropriate ratio for the mask radius to aperture radius. However, with no shoulder, some light reflected off the surface of the mask facing the aperture would actually reflect at an angle back below the horizon of the aperture plane (angles greater than 90° from the axis). Such reflected light would typically be outside the desired field of view and diminish the efficiency of the system. A mirror-like or specular surface on a shoulder area extending outward adjacent the cavity and preferably formed about a substantial portion of the cavity serves to recapture such light for transmission in the desired field of view.

The specular shoulder by itself produces a U-shaped intensity distribution, with a low point near the system axis and high intensities at angles approaching 90° off the system axis. The combination of a specular shoulder with the mask and cavity system results in a distribution that is very nearly flat from −90° to 90° relative to the system axis, and approaching the line having the points indicated by squares, in FIG. 3.

As shown by this example, the specular surface on the shoulder surrounding the cavity increases the energy in the angular range relatively far off from the axis and approaching perpendicular to the axis. This increase in off-axis performance can be utilized in a number of different ways. For example, consider a mask and cavity dimensioned to illuminate with a moderately low intensity in angles about the axis of the mask and cavity, with higher intensity in angular regions further out from the axis. The addition of a specular shoulder 32 in such a system further increases the off-axis intensity. As noted earlier, planar uniformity over a desired footprint perpendicular to the axis requires a higher light intensity at angles further out from the axis of the transducer system. Thus, a system comprising this mask and cavity together with the specular shoulder would actually produce an intensity distribution designed to meet a planar uniformity, such as that shown by the curve with darkened diamond points in FIG. 5A.

Another preferred technique for improving efficiency and further tailoring performance characteristics involves use of a retro-reflector. In a first type of application, the retro-reflector forms a ring about a substantial portion of the periphery of the transducer system, for example around a lateral shoulder of the system. In another type application, the retro-reflector may extend in other directions around the system, for example across an axis of the system opposite the mask and cavity. The retro-reflector provides another form of occlusion in a direction somewhat different from the constructive occlusion provided by the mask. Consider first the transducer system 70 of FIG. 7, in order to understand the effects of the retro-reflective ring.

Figure 7:
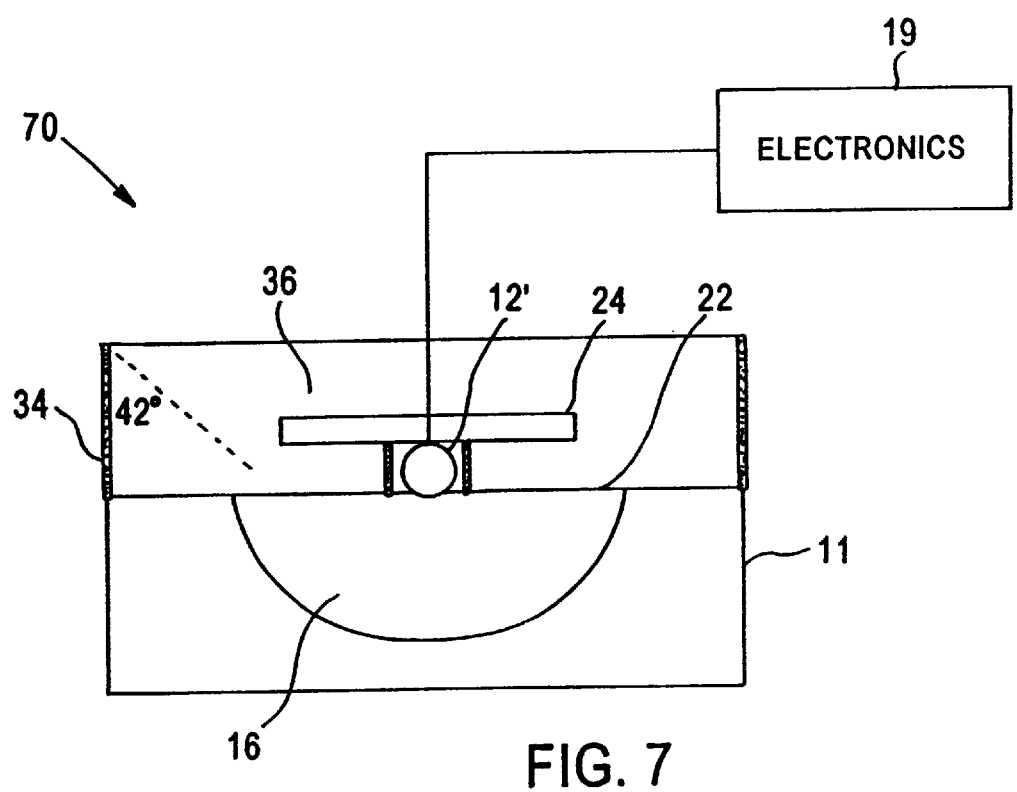
FIG. 7 is a cross-sectional view of a transducer system in accord with the invention utilizing a retro-reflective ring to further tailor the performance characteristic thereof.

In the example of FIG. 7, there is no baffle between the mask and the aperture, and the point source comprises a lamp mounted between the mask and the aperture. Otherwise, the structure and operation of the constructive occlusion transducer system 70 are generally the same as those of the system 10 of FIG. 1, and like reference numerals have been used to indicate corresponding system elements.

As in the embodiment of FIG. 1, the system 70 comprises a base 11 having a Lambertian surface type active area LS, a transducer and a diffusely reflective mask 24 occluding a portion of the active area of the base. Although the transducer could be an optical to electrical transducer for a detector system, for purposes of discussion it is assumed that the transducer is a radiant energy source. In FIG. 7, the source takes the form of an LED, a lamp, or in a specific example, a light bulb 12'.

In this embodiment, the light bulb 12' is supported by the mask 24 in the region between the mask 24 and the cavity 16, within a reflective enclosure (shown in cross-section as bold, solid lines). The electronics 19 provide an appropriate signal to drive the bulb 12' to emit light, preferably in the visible range. The diffuse reflectivity of the enclosure panels and the facing surface of the mask 24 efficiently direct virtually all of the light emitted by the bulb 12' down into the cavity 16.

In this example, the aperture 22 of the diffusely reflective cavity 16 again forms the optically active area on the base 11, and that area LS has substantially Lambertian energy distribution properties. The cavity 16 diffusely reflects light radiating from the light bulb 12' so as to create a uniform illumination through the aperture 22 of the cavity 16. The diffusely reflective mask 24 is positioned to constructively occlude a portion of the optically active area of the system. The light redirected back from the mask 24 into the cavity 16, on average, reflects many times within the space formed by the cavity 16 and adjacent diffusely reflective components, to emit light with a tailored intensity distribution pattern, for example the predicted pattern shown in FIG. 5A to produce a planar uniformity.

The cavity and mask direct some of the light outward at an angle from the axis that is wider than the maximum angle of the desired field of view and approaching the horizon of the system 70. If such light were allowed to pass out of the field view, the loss of such out-of-range light energy would reduce the system efficiency. However, in accord with this embodiment of the invention, the system 70 includes a retro-reflector extending out from the base toward the field of view, and thus over the out-of-range area.

The retro-reflector is contoured to enclose one or more sides of the system at a distance from the aperture. Typically, the retro-reflector is positioned along a part or around all of the lateral periphery of the system 70 and conforms to the shape of the outer periphery of the system 70. In the illustrated embodiment, the retro-reflector takes the form of a circular ring 34 having a retro-reflective inner surface 36.

The ring 34 may comprise a rigid substrate, typically an injection molded plastic, which is coated to make its inner surface 36 retro-reflective. For example, the ring 34 may have a coating of a diffusely reflective material, which in turn is coated with transparent microspheres, to produce the retro-reflectivity. A variety of other known retro-reflective materials may be used.

Recall that a diffuse reflector reflects a beam of light incident from one direction out in all directions. A specular reflector has a mirror-like finish. By contrast, a retro-reflector, such as the surface 36, reflects incident light back towards its source, along the same path or a path substantially parallel to the path of incidence. Thus, in the system 70, the retro-reflective surface 36 on the ring 34 redirects light from regions relatively far off the system axis back to the aperture 22, cavity 16 and mask 24, for further optical processing.

A suitable retro-reflector may be formed of small reflective corner cubes but preferably comprises small balls or micro-spheres of transparent glass or plastic, secured on a white reflective substrate. These materials have been used in retro-reflective tapes, for example SCOTCH LITE. One approach to constructing the retro-reflective ring 34 is to form the ring of a rigid substrate material, such as an injection molded plastic, and then cover the inner surface with such an available retro-reflective tape. Retro-reflective paints could be used, but the tapes currently are preferred.

Figure 10A:
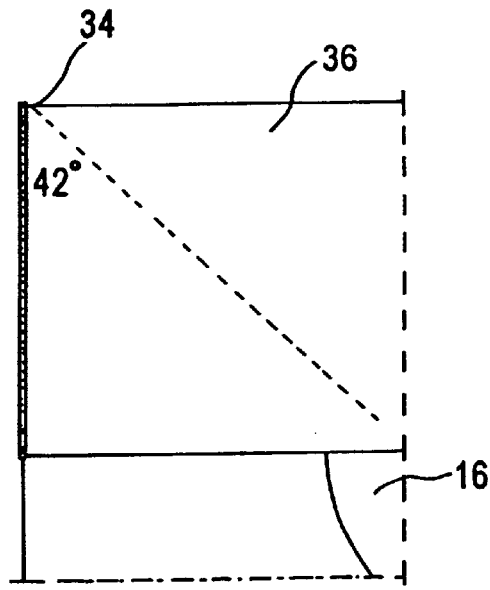
FIGS. 10A–10C are detail views of cross-sections of retro-reflective rings of three different shapes.
Figure 10B:
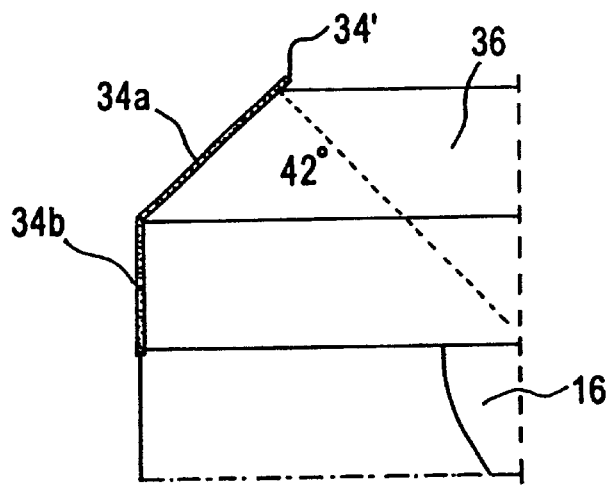
Figure 10C:
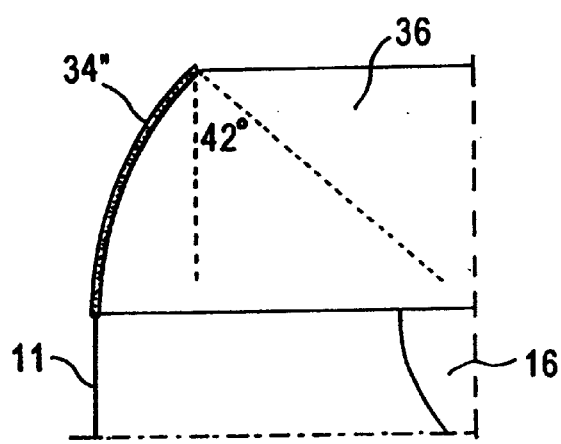

In this embodiment, the ring 34 takes the form of a straight cylinder. From above, the ring would appear to follow the outer contour of the circular base. In cross-section, the retro-reflective ring extends out perpendicular from the surface of the shoulder surrounding the aperture 22 toward the desired field of view. FIGS. 10A–10C are detail views showing three examples of different cross-sectional shapes for the retro-reflective rings, as will be discussed in more detail later. Of note here, FIG. 10A shows a straight vertical wall structure for the ring 34, for example, corresponding to the ring in the embodiment of FIG. 7.

The surface of the shoulder between the ring and the aperture may have a diffuse reflectivity, or the surface of the shoulder may have a retro-reflective characteristic similar to that of the inner surface 36 of the ring 34. An embodiment with a non-diffuse reflective shoulder, preferably a specular shoulder, is discussed in more detail later.

The upper edge of the retro-reflective ring limits the field of view of the optical system. Light emerging from the cavity aperture 22 or reflected from the side of the mask 24 at an angle so as to pass above the ring and leave the system 70, is within the field of view of the illuminating system 70. Light emerging from the cavity aperture 22 at an angle that is below the top of the ring impacts on the retro-reflective inner surface 36 of the ring 34, and that surface reflects such light back into the system 70. The field of view of the exemplary system 70 has a half-angle, that is to say an angle with respect to the vertical, of 42°.

For a mask and cavity type system, the angle of the field of view is best defined by a line drawn from the top of the ring to the center of the gap between the edge of the aperture 22 and the edge of the mask 24. The angle of that line with respect to the vertical, e.g. the axis of the base, cavity and mask, is the same as the angle between that line and the vertical (e.g. the wall of the ring in this embodiment). In the illustrated system, this angle of the field of view is 4°.

For simplicity of illustration, the systems with retro-reflective rings shown in the drawings have a half-angle of the 42°. One skilled in the art will recognize that modification of the height or the shape of the ring and/or the distance of the ring from the aperture results in a system having a different half-angle for the field of view. For example, a taller ring or a ring of the same height curved or bent to extend inward towards the system axis at its distal end would result in a smaller half-angle for the field of view.

The retro-reflective surface 36 on the ring 34 effectively recycles light, that otherwise would pass out of the desired field of view, back to the diffusely reflective mask and cavity elements. After repeated diffuse reflections, the light again emerges but now at an angle that does not impact on the retro-reflective surface 36. Such light is within the field of view and therefore serves to illuminate the desired footprint covered by that field of view.

As in the earlier embodiments, the cavity 16 and mask 24 have been configured to emit light with a particular, tailored distribution, for example a planar uniformity of the type represented by the curves of FIGS. 5A and 5B. In one example producing this planar uniformity, the ratio of the height of the mask to the radius of the aperture is approximately 0.6. The light directed back into the system by the retro-reflective surface 36 on the ring 34 is distributed in the same manner and adds to the other light emitted within the field of view in that pattern. The retro-reflection of the extreme off-axis light into the field of view nearer to the axis thus increases the intensity of illumination over the desired distribution within the field of view (raising the entire intensity distribution pattern on the graph over the field of view). The system with the retro-reflective ring therefore is more efficient in illuminating objects or areas within its intended field of view.

The retro-reflective ring also produces a sharper fall-off in illumination intensity at the edge of the field of view. The further the ring is from the aperture, the higher the ring must be to limit the field of view to a particular angle, but the sharper the resultant fall-off at the edge of the field of view.

Although the above discussion has concentrated on an implementation of the retro-reflective ring in an illuminating system, the principle of using the ring applies also to optical-to-electrical transducer systems, e.g. to light detector systems. The ring limits the angular range of the field of view of a detector system. The retro-reflectivity redirects some light that the diffuse surfaces of the mask and cavity elements would otherwise reflect out of the system, into the regions approaching the horizon, back into the mask and cavity of the system. This increases the percentage of the light impacting on the actual optical-to-electrical transducer, and improves the sensitivity of the detector system.

The above-discussed retro-reflector serves to cut-off the field of view and to direct light from angles that would otherwise be outside of the field of view back into the diffuse elements of the system, for re-emission within the field of view. The reflective shoulder, with a non-diffuse reflective characteristic, helps to increase the intensity of light at angles out near the edge of the field of view. These two techniques can be combined to produce a desired performance over a specified footprint and to enhance the efficiency of the system. As an example, consider the combination of a retro-reflector with a specular shoulder, as in the embodiment of FIGS. 8A–8C, to efficiently produce a high degree of planar uniformity over a rectangular footprint.

FIG. 8A is a top plan view of another embodiment 90 of the invention. Although the system 90 could include an optical to electrical transducer element and serve as a sensor system, for purposes of discussion assume that the system includes a light source and serves as a visible lighting system.

This embodiment utilizes a segment of a cylinder, typically a half-cylinder, as the cavity. The cavity has a rectangular aperture. The mask also is rectangular. As a result, the transducer system of FIG. 8A generally exhibits a rectangular field of view or illuminates a rectangular footprint. The rectangles could be squares, but in the illustrated example, the sides and ends of each rectangle have different lengths. The exact lengths may vary widely for different applications. This embodiment also utilizes a retro-reflective ring, similar to that of the embodiment of FIG. 7 in combination with a specular shoulder between the edge of the aperture and the ring similar to that discussed above relative to FIG. 6. The retro-reflective ring and specular shoulder together with the appropriate dimensioning of the constructive occlusion mask and cavity enable the transducer system 90 to exhibit a uniform planar performance characteristic over the rectangular footprint. Assuming that the system is configured as an illuminating type system, for example, the system 90 provides a uniform illumination over a rectangular section of a plane at a known distance from the aperture and perpendicular to the central axis of the system. Further discussion of the system of FIGS. 8A–8B will concentrate on the embodiment thereof as a lighting system.

FIG. 8B is a cross-sectional side elevation view of the transducer system 90 taken along line B—B of FIG. 8A. FIG. 8C is a cross-sectional front elevation view of the transducer system 90 taken along line C—C of FIG. 8A. As shown in these three drawings, the system 90 comprises a base 91. For convenience, the base 91 appears rectangular in shape, although the shape of the base is not critical. Within the base 91, there is a cavity 93.

In this embodiment, the cavity 93 is a segment of a cylinder, preferably about half of a cylinder. Thus, the cross-sectional view from the side (FIG. 8B) shows the semi-circular cross-section of the cavity 93. The front cross-sectional view (FIG. 8C) shows the rectangular edge of the cavity 93. The inner surfaces of the cavity 93 have a diffuse reflective characteristic. As in the earlier embodiments, the material of the base 91 may be diffusely reflective, or the cavity surfaces may have a diffusely reflective coating thereon.

The outer edge of the cavity 93 forms the periphery of an aperture 95, which serves as the Lambertian optical active area of the system 90. The half-cylindrical cavity 93 provides a rectangular aperture 95. A rectangular mask 97 constructively occludes a substantial portion of the aperture 95. At least the surface of the mask 97 that faces towards the aperture 95 of the cavity 93 has a diffuse reflective characteristic. Preferably, all of the outer surfaces of the mask are diffusely reflective. As in the earlier embodiments, the material of the mask 97 may be diffusely reflective, or the desired surfaces of the mask may have a diffusely reflective coating thereon.

When constructed as a lighting system, the transducer system 90 includes a light source, in this case a tubular light bulb 99. In this embodiment, the light bulb 99 is supported by the mask in the region between the mask 97 and the cavity 93, between two reflective panels 101. The diffuse reflectivity of the panels 101 and the facing surface of the mask 97 efficiently direct virtually all of the light emitted by the bulb 99 down into the cavity 93. The light reflects repeatedly between the walls of the cavity 93 and the surface of the mask 97 until it emerges through the gap formed between the periphery of the aperture 95 and the edge of the mask 97.

The lighting system 90 also includes a retro-reflective ring 103. The ring 103 surrounds the aperture 93 and mask 97.

Preferably, the ring 93 is rectangular, corresponding in shape to the peripheries of the base and the aperture, and is equally spaced outward from the edge of the aperture 93 toward the periphery of the base. The surface of the base 91 supports the ring 103 such that the ring extends out from the base, generally toward the field of view and/or the intended footprint. In this example, all four sides of the rectangular ring 103 extend straight out perpendicular to the surface of the base 91. As discussed more below, any or all of the sides may be angled inward, bent inward or curved inward, to achieve a desired performance.

The inner surface of the ring 103 comprises a retro-reflective material similar to one of the retro-reflective materials discussed above. The retro-reflective characteristic of the inner surface of the ring 103 causes the ring to redirect light that emerges from the gap at extreme angles out from the axis of the system back into the mask and cavity system, for subsequent redirection and emission at an angle somewhat closer to the central axis of the system. For example, light emerging from the cavity 93 through aperture 95 at a wide angle from the central axis (approaching the horizon) hits the inner wall of the retro-reflective ring 103, and the retro-reflective inner surface thereof directs such light back into the cavity. The light reflects off the diffuse surfaces of the cavity and mask until emerging in the desired field of view. In this manner, the ring 103 not only limits the angle of emission of the light to the desired maximum angle but improves efficiency of the system 90 by recycling off-axis light for inclusion within the desired field of illumination.

Also, some light emerging from the cavity 93 through aperture 95 impacts on the outer surfaces of the panels 101. These surfaces are diffusely reflective and direct most such light out toward the horizon, far off the central axis and outside the desired field of illumination of the system 90. However, this light hits the inner wall of the retro-reflective ring 103, and the retro-reflective inner surface thereof directs such light back to the panels 101 and the cavity 93. Further repetitive diffuse reflection of the light within the system ultimately results in emission of the light within the desired field of illumination.

The shoulder area 105 surrounding the aperture 93 has a non-diffuse reflective characteristic of a type selected to help tailor the performance characteristic of the transducer system 90 to a particular application. For some applications, the shoulder surface may have a retro-reflective characteristic.

For purposes of further discussion of the example of FIGS. 8A–8C, however, assume that the lighting system 90 has a specular shoulder 105 surrounding the aperture 93. In this embodiment, the surface area on the base, between the edge of the aperture 93 and end of the ring 103 attached to the base 91, forms the shoulder 105. The entire surface area of this shoulder exhibits a highly specular reflectivity. For this purpose, the surface of the shoulder 105 may be polished aluminum or silvered and glass coated to form a mirrored finish.

Some of the light from the cavity 93 reflects off of the facing surface of the mask 97 at such an angle as to impact on the shoulder area 105. The specular shoulder 105 reflects the light. If the reflected light has an angle within the opening formed by the top of the ring 103, the light emerges to illuminate the desired footprint. Typically, such light enhances lighting intensity at angles out from the axis, and near the edge of the field of view.

Often, the light reflected from the specular shoulder area 105 will impact on the retro-reflective inner surface of the ring 103. The ring 103 redirects such light back to reflect off the shoulder 104 and thence to the surface of the mask 97 facing the aperture 95 of the cavity 93. Such light diffusely reflects within the space between the cavity 93 and mask 97 until it emerges from the system 90 at an angle within the desired field of view.

The light emitted by the bulb 99 will reflect many times from various combinations of the diffusely reflective panels 101, the diffusely reflective cavity 93, the diffusely reflective surfaces of the mask 97, the specular reflective shoulder 105 and the retro-reflective inner surface of the ring 103, until emerging within the desired field of view. As in the example of FIG. 7, the distal edge of the ring 103 defines the peripheral limiting opening of the system and thus the periphery of the field of view of the illuminating system 90. Stated another way, the angle of a line drawn between the middle of the gap between the mask and the aperture and the distal edge of the adjacent wall of the ring 103 forms the maximum angle for most of the light emitted by the system. These half angles on the various sides of the system define the field of illumination for the majority of the light produced and emitted by the system 90.

The ring 103 thus limits the field of view to the appropriate angle for illuminating a desired planar footprint at a specified distance from the system. The ring also recycles light to enhance efficiency. The specular shoulder and the dimensioning of the mask and cavity elements cooperate in such a manner that the emissions within the field of view have a precisely tailored intensity distribution pattern. Although slightly more complex in calculation, the height to aperture size ratio and the mask size to aperture size ratio can be substantially the same as in the example of FIG. 7. In this case, the system 90 emits light at a higher intensity in areas out near the edges of the field of view, in such a manner as to uniformly illuminate the desired planar footprint. Because of the rectangular shape of the elements (FIG. 8A), the uniformly illuminated planar footprint is rectangular. If mounted on a ceiling in an office, for example, the lighting system 90 would provide uniform lighting over a rectangular floor space or on a rectangular desktop.

Some retro-reflective materials have a limited angle of acceptance. The angle of acceptance is the maximum angle from the vertical to the reflective surface at which the material will reflect in a retro manner. From a direction perpendicular to the reflective surface out to the angle of acceptance, the retro-reflective material reflects incident light back along the same or a closely parallel path from which the light arrived. Beyond the angle of acceptance, however, the material may reflect light but not back in the direction from which it arrived. Often, materials with a wider angle of acceptance are more expensive than materials with a smaller angle of acceptance.

Figure 8:
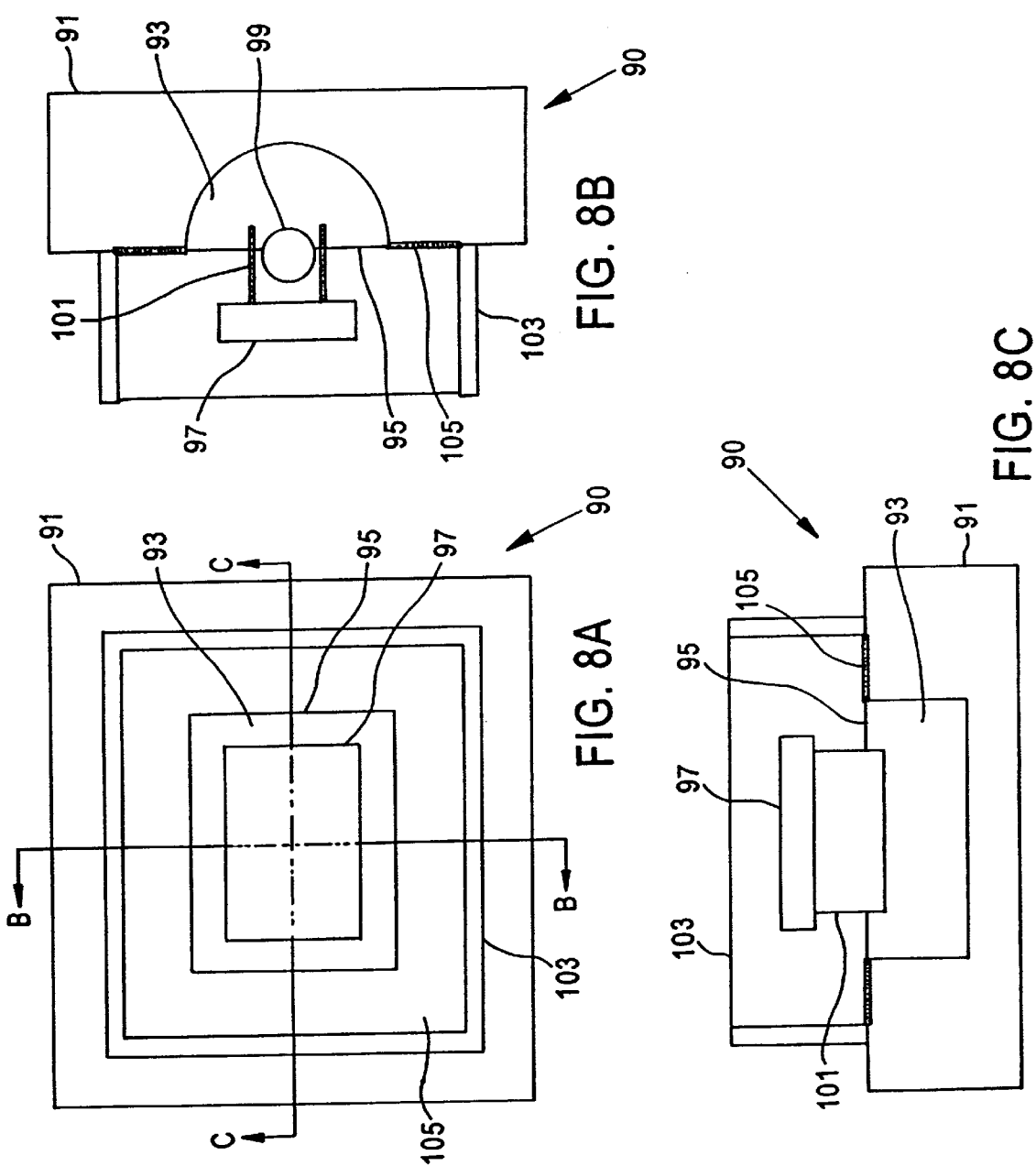
FIGS. 8A–8C are different views of another embodiment of a transducer system in accord with the invention, in this case, illuminating a rectangular footprint with a uniform intensity.

In systems of the type illustrated in FIGS. 7 and 8. light emerging from the gap between the aperture and the mask and impacting near the distal end of the ring will has a relatively large angle of incidence (nearing 42° in the examples). Also, some light that impacts first on the shoulder area and then impacts on the retro-reflective surface of the ring may have a large angle relative to the reflective surface of a perpendicular ring. For some types of retro-reflective materials, these angles may be larger than the angle of acceptance for the particular material.

In systems of the type under consideration here, the retro-reflective ring may be bent or curved, preferably inward. One result of such a modification is that over much of the inner surface of the ring the angle of light incident on the surface from the gap between the aperture and the mask or from reflections off the shoulder will have an angle of incidence to the surface which is closer to perpendicular to the reflective surface.

Figure 9:
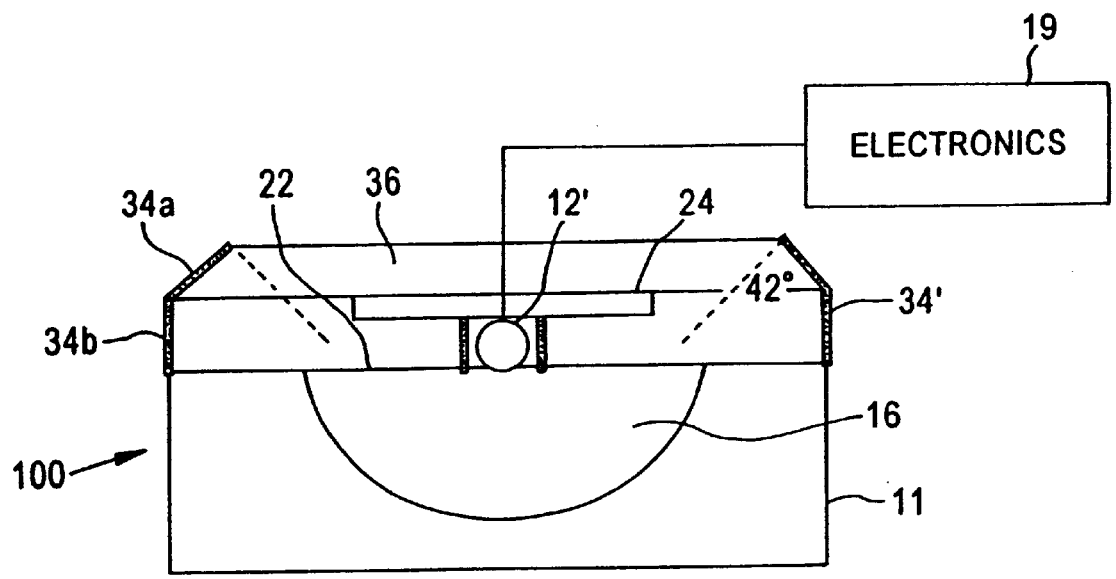
FIG. 9 is a cross-sectional view of a transducer system similar to that of FIG. 7 but having a bent retro-reflective ring.

FIG. 9 depicts a transducer system, similar to the system of FIG. 7, and like reference numerals indicate corresponding system elements. The notable difference is that the system 90 incorporates a bent retro-reflective ring. FIG. 10B is an enlarged detail view of a portion of the bent ring structure.

In this embodiment, the ring 34' has two sections. A first section 34b extends from a proximal end vertically out from the shoulder of the base toward the field of view. The second section 34a bends inward at an angle with respect to the vertical. The distal end of the ring, at the end of section 34a, defines the outer edge or limit of the field of view of the system. The inner surface 36, of at least the upper section 34a, has a retro-reflective characteristic.

The angled structure makes the actual height of the ring needed to define a desired half-angle for the field of view somewhat smaller than for the straight structure. Also, because of the angle, light will impact on the retro-reflective surface of the section 34a at an incident angle that is closer to perpendicular to that surface. This allows the use of a less efficient retro-reflective material on this surface, since typically less efficient retro-reflectors require a relatively large angle of incidence (small angle of acceptance).

FIG. 10C shows another ring structure, in this case, a curved ring structure. Although not shown in full as a separate embodiment, the system incorporating ring 34" would generally be similar to the embodiments of FIGS. 7 and 9. The ring 34" initially extends almost vertically out from the shoulder of the base 11, but as it extends away from the base and generally toward the field of view and the intended illumination footprint, it curves inward toward the axis of the system. The inner surface 36 has a retro-reflective characteristic.

As in the bent structure example, the height of the ring 34" necessary to limit the field of view to a desired angle (42° in our example) is somewhat smaller than required with the straight ring structure. Also, because of the curvature, light will impact on the retro-reflective surface 36 at angles generally closer to perpendicular to that surface, which allows the use of a less efficient retro-reflective material on this surface.

Other ring structures also may be used to angle the ring inward. For example, the ring could slant inward. In a circular ring, the slanted inner surface of the ring would take the form of a cone.

Figure 11:
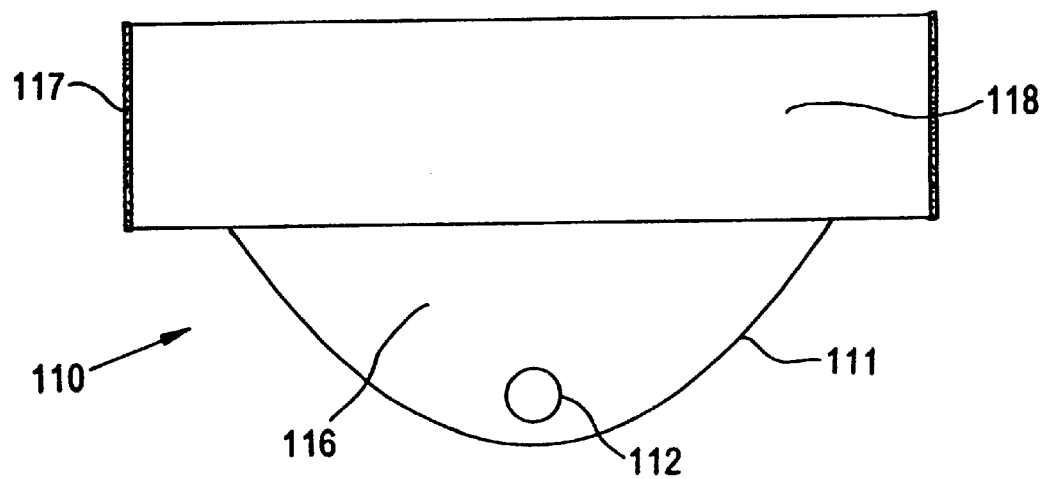
FIG. 11 is a cross-sectional view of another transducer system utilizing a retro-reflective ring around a source and parabolic reflector.

Although preferably used in combination, the concepts of the present invention may be used separately. For example, the specular shoulder and/or the retro-reflective ring may be used in transducer systems, which need not necessarily utilize the principles of constructive occlusion. In this regard, FIG. 11 depicts an example of a lighting type transducer system 110, incorporating a retro-reflective ring.

The lighting system 110 includes a source 112, such as a lamp or light bulb. For convenience, the circuitry for producing the current to drive the light bulb 112 has been omitted.

The system 110 includes a light distributor, for distributing the emitted light with a desired intensity distribution. In this example, the distributor is a parabolic reflector. The reflector comprises a rigid shell 111 coated or otherwise processed to have a specular inner surface 116. The shell 111 has a parabolic shape, such that the reflective surface 116 directs the light emitted by the bulb 112 toward the desired field of view. Because of the parabolic shape of the reflector, much of the reflected light attains an angle near parallel to the axis of the parabola. Although not shown, the distributor could include a diffuser and/or additional reflective surfaces alone or in combination with the reflector.

The light distributor distributes light from the source with a desired intensity distribution over the field of view. However, some light still emerges from the bulb and reflector at an angle outside the desired field of view. In accord with the invention, the system 110 also includes a rigid ring 117 coated or otherwise processed to have an inner surface 118 with a retro-reflective characteristic, in a manner similar to the retro-reflective surfaces discussed above. The retro-reflective inner surface 118 reflects light back in the same direction or a direction substantially parallel to the path of incidence to that surface. As a result, light that would emerge at angles so far off from the system axis as to pass out of the desired field of view is reflected back into the parabolic reflector for redirection into the desired field of view.

The shapes and materials of the retro-reflective ring, described above are preferred embodiments only. Other shapes and other materials could perform the retro-reflective function.

For example, the retro-reflective rings in the above discussed embodiments utilized micro-retro-reflective materials. It would also be possible to build a macro-type retro-reflector. In such an embodiment, the ring would have a first wall extending perpendicular to the surface of the shoulder and a second wall extending inward perpendicular to the first wall (parallel to the shoulder surface). The surfaces of the walls facing toward the aperture would have a mirror-like finish to produce a high-specular reflectivity. The joint between the two walls of such a ring would form a reflective corner, and act much like a corner cube, to direct light emitted from the aperture but outside the field of view back into the aperture for further processing.

Also, the examples discussed above utilize a ring fully surrounding and having the same proportions on all sides of the mask and cavity because of a desire to produce a symmetrical performance characteristic. However, for applications requiring variations in the performance characteristic, the character of the ring may differ on different sides of the mask and cavity. For example, if a wider field of view were desired on one side than the other, there might be no ring on the one side. Such a ring would enclose the mask and cavity on only the side(s) requiring the smaller half-angle for the field of view. Alternatively, the height and/or spacing of the ring from the aperture may vary at different points around the aperture and mask, to produce a desired field of view and performance characteristic. For example, in a rectangular system such as 90, retro-reflectors may extend along parts of the four sides, but the corners of the rectangular system may be open. Alternatively, the system may have retro-reflectors around one or more corners but have open sides. Similarly, embodiments with the non-diffuse reflective shoulder may have such reflectivity on only certain portions of the shoulder adjacent limited portions of the periphery of the distributor.

The principles of the present invention find application in a variety of transducer systems. For example, although the embodiments discussed above have been single transducer element type systems, the principles apply to multiple element systems. The quadrant hemispherical detector disclosed in the above incorporated U.S. Pat. No. 5,705,804, for example, could be enhanced by the addition of a retro-reflective ring and/or a specular shoulder.

Consider a retro-reflective ring applied to that quadrant detector. Some detector applications do not require sensitivity out in the angular ranges relatively far off the axis of the detecting transducer system. Addition of a retro-reflective ring surrounding the mask and aperture of the quadrant hemispherical detector would limit the field of view to a desired range and increase the sensitivity of the transducer system within the limited field of view.

To understand how this works, consider that some received light entering the diffusely reflective components of the mask and cavity system bounces around and emerges, without impinging on one of the internal detectors. The retro-reflective ring redirects at least some of this light that is outside of the field of view back into the aperture, cavity and mask of the system, exactly as in the illuminating embodiments discussed above. The diffuse reflectivity within the mask and cavity couples at least a portion of the light directed back into the cavity by the ring to impinge on an appropriate one of the detectors, thus increasing system sensitivity.

Figure 12A:
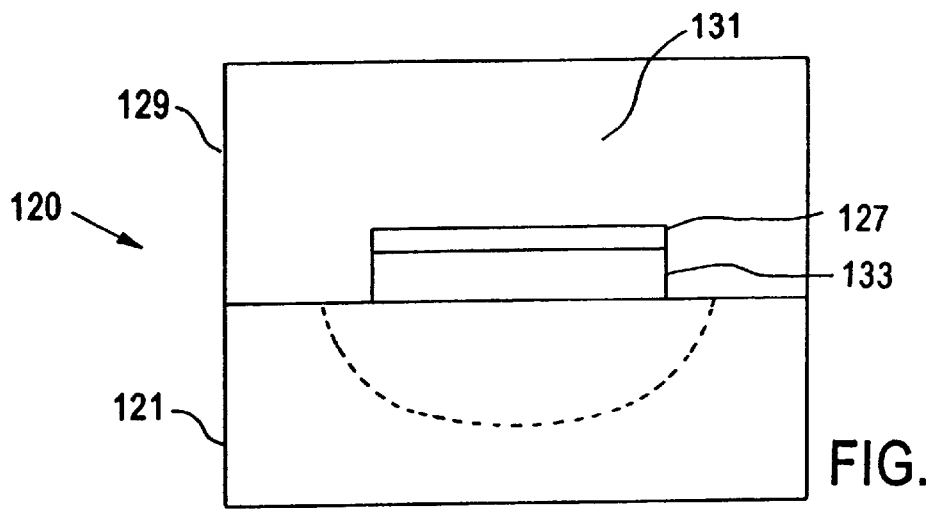
FIGS. 12A and 12B are front elevational and side cross-sectional views of an embodiment of a transducer system in accord with the invention utilizing one or more reflective walls as a system cut-off.
Figure 12B:
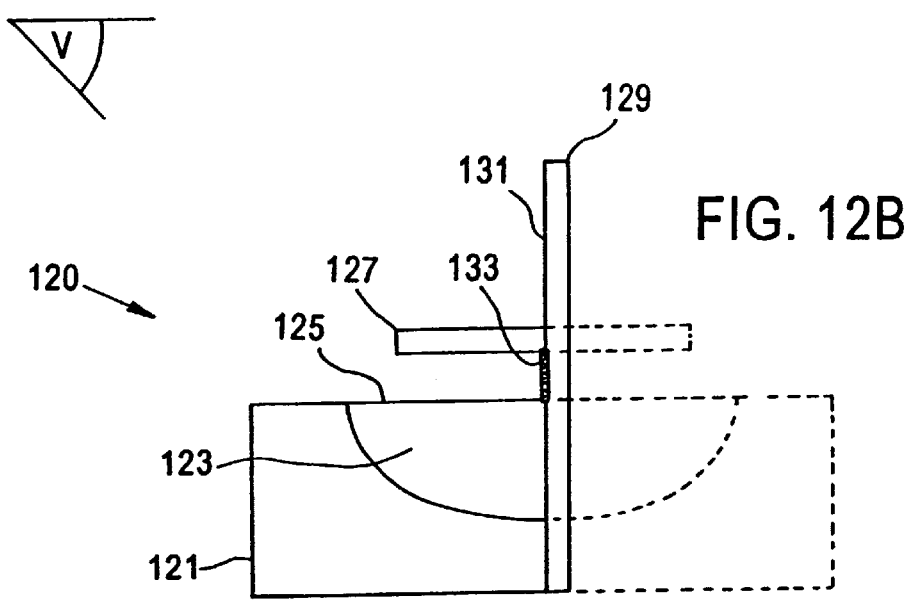

FIGS. 12A and 12B are front and cross-sectional views of another embodiment of the invention and help to illustrate another technique for tailoring transducer system performance. For some applications, it is desirable for the field of view to extend out in only one half of the angular range, for example where the transducer system is to be mounted on a building or cabinet wall, and the field of view extends alongside the wall. However, over the field of view, there is still a need for a high efficiency and a desired performance characteristic (intensity or sensitivity distribution). To meet such needs, several of the embodiments of the invention essentially comprise a constructive occlusion type mask and cavity system structured as if it had been cut-off or 'cut in half' approximately along its center line. A reflective wall or mirror limits the field of view to the one side of the centerline and a mirror image of the remaining system components appears as a projection in the reflective.

The system 120 comprises a base 121 having a diffusely reflective cavity 123. Again, the cavity and mask may have a variety of shapes, but for discussion we will assume that cavity 123 approximates the quarter of a sphere. The inner surface of the cavity 123 is diffusely reflective. The aperture 125 and the mask 127 are semi-circular. The aperture forms a Lambertian, planar surface, along the top of the cavity 123 in the illustrated orientation. The mask is a disc positioned parallel to the aperture. In such a system, the system axis is the center line of the half-circles from which respective radii of the mask and aperture extend. This axis is substantially perpendicular to the aperture plane. At least the surface of the mask 127 facing the aperture 125 is diffusely reflective, and preferably the entire outer surface of the mask is diffusely reflective. For simplicity of illustration, the transducer has been omitted.

The first cut-off embodiment uses a single reflective wall, with substantially coplanar sections between the mask and cavity and outside the mask and cavity. Thus, in the illustrated embodiment, a rigid, reflective wall 129 abuts the end of the base 121. The wall 129 extends at least from the lower portion of the cavity 123 to a height substantially above the mask 127. Although the wall 129 could be angled, preferably the angle of the wall 129 is at or about 90° with respect to the plane of the aperture 125. As such, the system axis is within the plane of the reflective wall 129.

In the example of FIGS. 12A, 12B, the system 120 includes a diffusely reflective baffle 133 mounted on the wall 129 in the space between the mask 127 and the aperture 125. At least the exposed surface portion 131 of the wall 129, around the mask 127 and the baffle 133 and facing toward the front of the system 120, has a specular reflective characteristic.

The exposed area of the wall 129 at the back of the cavity 123 is reflective, although in some cases the reflectivity of this surface area may be diffuse or specular, depending on the application and desired performance. In an example of a system 120 for emission out toward the horizon, where the system includes the diffuse baffle 133, the portion of the flat wall 129 at the back of the cavity 123 preferably is diffusely reflective.

From a vantage point V within the field of view, the effect of the substantially perpendicular mirrored surface 131 is to make the system 120 look like a full circular type mask and cavity system, similar to that of FIG. 1 or FIG. 6. The observer at point V would see the actual elements shown in solid line as well as mirror image elements in the surface 131, as represented by the dotted line portions in FIG. 12B.

In an illuminating type system, for example, the system 120 emits light in a pattern similar to a fully symmetrical system, as if the dotted line or phantom potions were real. However, substantially all of the light emerges into the truncated field of view, to the left in FIG. 12B, increasing the power output in that field. The system 120 therefore will provide a performance characteristic similar to that of the other systems but truncated to cover only about 0° to 90°. For example, if the transducer system 120 is an illuminating system (light source not shown for convenience) designed for angular uniformity, the system 120 emits light with a power distribution approximately as shown in FIG. 12B. The emitted light intensity or power falls off sharply to the right of 0°, is substantially flat for angles from 0° to a region approaching 90° and falls off for angles out beyond 90°.

Figure 12C:
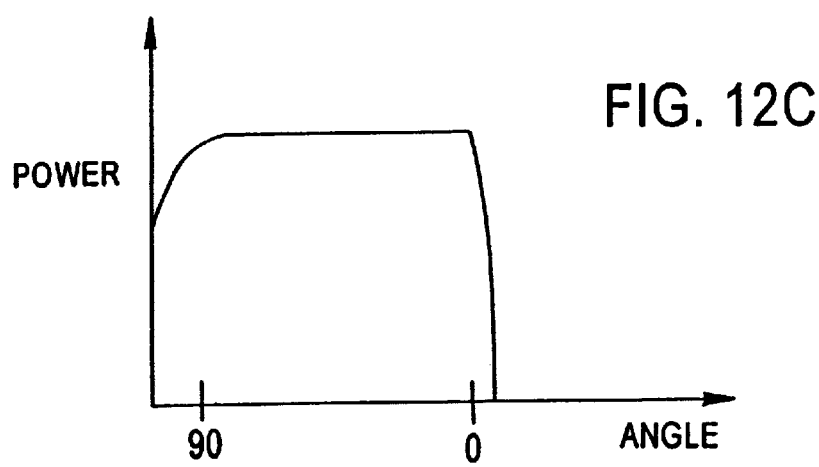
FIG. 12C is a graph approximating the angle versus lighting energy distribution for a lighting system having the structure shown in FIGS. 12A and 12B.

The necessary height of the mirrored surface 131 on the wall 129 depends on the size of the mask and cavity and the desired drop-off of the distribution for angles to the right of 0° in FIG. 12C. The slope of the fall-off is proportional to the height of the mirror. The higher the mirrored surface 131, the sharper the fall-off of emission in that direction. Conversely, the shorter the mirror 131, the slower the fall-off.

Figure 13A:
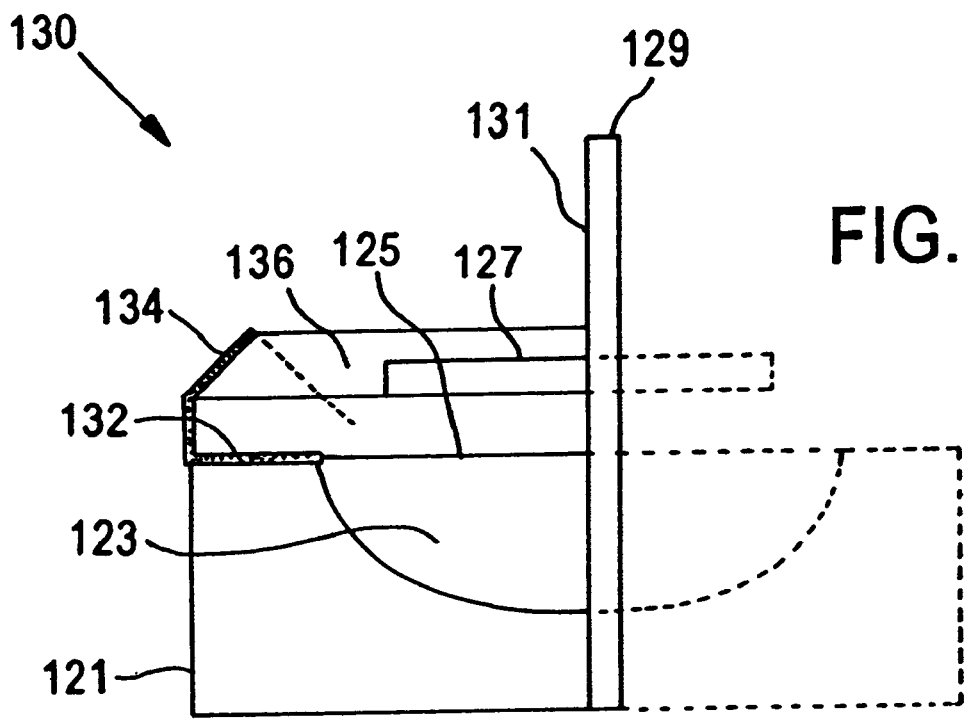
FIG. 13A is a cross-sectional view of an embodiment of a transducer system similar to that of FIG. 12B but with the addition of a retro-reflector and a reflective shoulder.

Like the other versions of the inventive transducer system, adjustment of the mask and aperture parameters and addition of a retro-reflector and/or a reflective material on the shoulder enables tailoring of the performance characteristic. FIG. 13A, for example, shows modifications of the system of FIGS. 12A, 12B to efficiently provide a planar uniformity.

The system 130 of FIG. 13A is generally the same as that of FIGS. 12A, 12B; and like reference numerals identify corresponding system elements. However, for a 42° field of view and a planar uniform performance characteristic, there is no need for a baffle. The surface of the flat wall at the back of the cavity 123 may be specular.

To increase efficiency, limit the field of view and provide a high degree of planar uniformity, the system 130 takes advantage of other aspects of the present invention. First, the system 130 includes a retro-reflective ring 134. The retro-reflector could be mounted on the wall 129 for certain applications, however, in this embodiment, the retro-reflector is mounted on the base 121. The retro-reflective ring 134 surrounds a portion of the aperture 125, in this case, the arcuate portion of the semi-circular aperture. The ring 134 stands along the semicircular periphery of the shoulder of the base 121. If viewed from above, the ring would appear to have a contour conforming to the outer contour of the base 121.

As in earlier embodiments, the ring 134 limits the half-angle of the field of view. In this example, the ring has a bent structure and limits the angle of view to approximately 42°. Rings of different heights and/or structures limit the field of view to different angles. The retro-reflective ring 134 is a rigid structure, bent at a predetermined angle, and having a retro-reflective characteristic on its inner surface 136. The retro-reflective inner surface 136 redirects light that would pass outside of the field of view back into the system for further diffuse reflective processing and ultimate emission within the desired angle of the field of view.

The system 130 also includes a non-diffuse reflective material 132 on the shoulder portion of the base 121. The reflective shoulder does not surround all sides of the aperture 135. The reflective shoulder 132, in this embodiment, surrounds the semi-circular aperture 125 on the arcuate or semi-circular shoulder and preferably covers the entire shoulder area between the periphery of the aperture 125 and the bottom or proximate end of the ring 134.

The reflective shoulder 132 may have a retro-reflective characteristic. It is preferred, however, that the shoulder 132 is specular. To produce the planar uniformity, the relative sizes of the mask and the aperture and the ratio of the mask height to the aperture radius are selected to produce a higher intensity or sensitivity at angles out closer to the edge of the desired field of view. The reflective shoulder 132, particularly if specular, further increases the intensity or sensitivity of the system at angles out closer to the edge of the desired field of view, in the manner discussed above relative to FIG. 6.

Figure 13B:
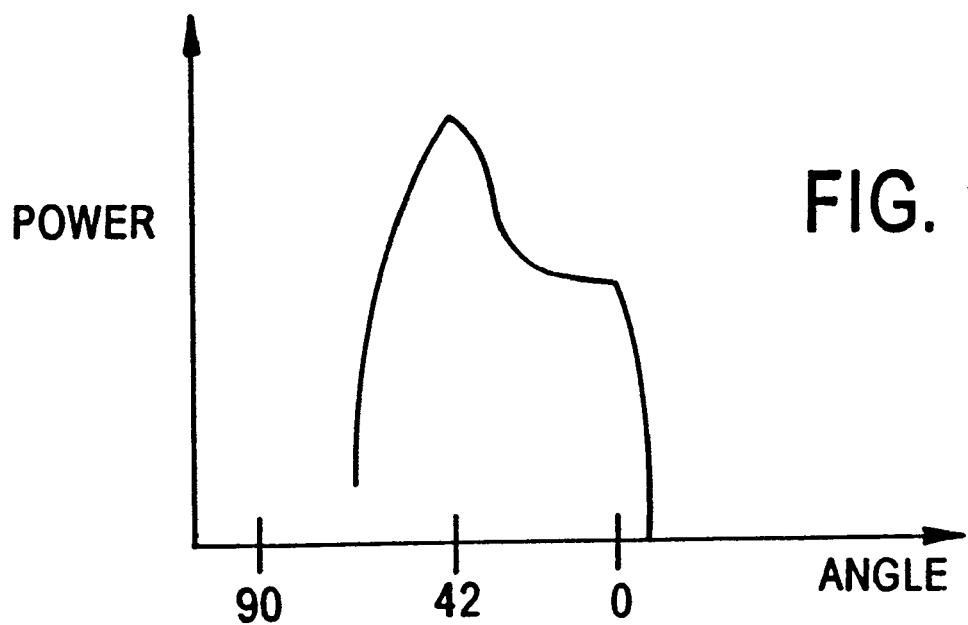
FIG. 13B is a graph approximating the angle versus lighting energy distribution for a lighting system having the structure shown in FIG. 13A.

Assume for discussion that the system 130 includes a light source (not shown) emitting light into the cavity 123. As a result of the selection of the mask and cavity parameters, the use of the reflective shoulder 132 and the retro-reflective ring 134, the system 130 produces a power distribution with respect to angle as approximated by the graph in FIG. 13B. The emitted light intensity or power falls off sharply to the right of 0°. However, within the field of view, the intensity starts at the desired level at angles around 0° and rises to a peak out near the edge of the desired field of view, in this case at about 42°. The emitted light intensity falls off sharply for angles out beyond 42°.

If the system 130 is mounted on a vertical building wall, with the wall 129 of the system against the surface of the building wall, the system 130 will provide a relatively uniform illumination over a planar surface extending out perpendicular to the building wall at a distance from the system. If the system 130 emits light upward, for example, the system would provide a uniform illumination of a portion of the ceiling. If pointed downward, the system might uniformly illuminate a section of the floor adjacent the wall or the top of a desk located near the wall. If mounted on a ceiling, the system 130 might provide a uniform illumination of an art object mounted on a nearby vertical building wall.

Figures 14A, 14B:
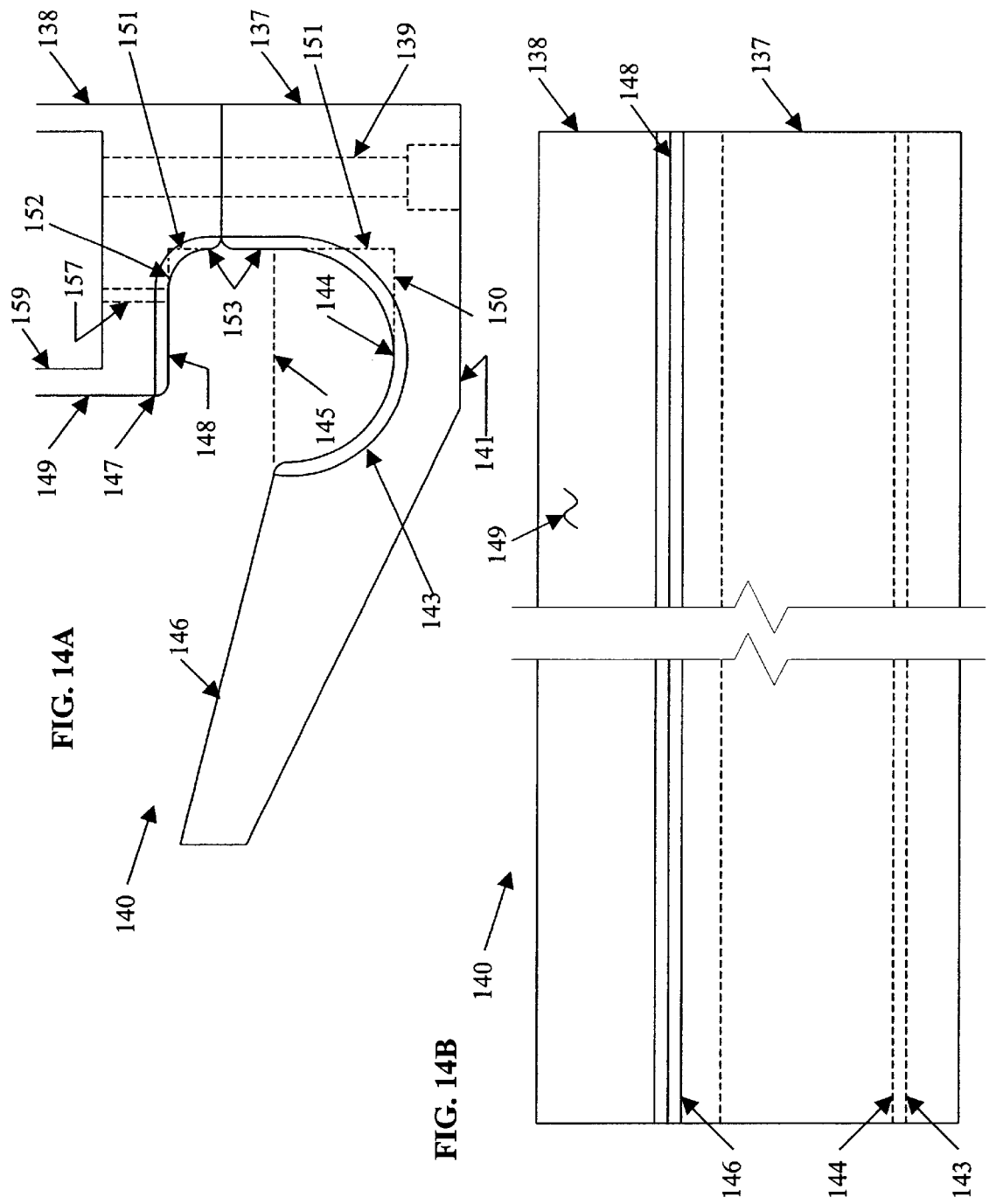
FIG. 14A is an end view of a practical embodiment of a system utilizing the principles of constructive occlusion in combination with reflective cut-off walls and an inclined specular shoulder.
FIG. 14B is a front elevational view.
Figure 14C:
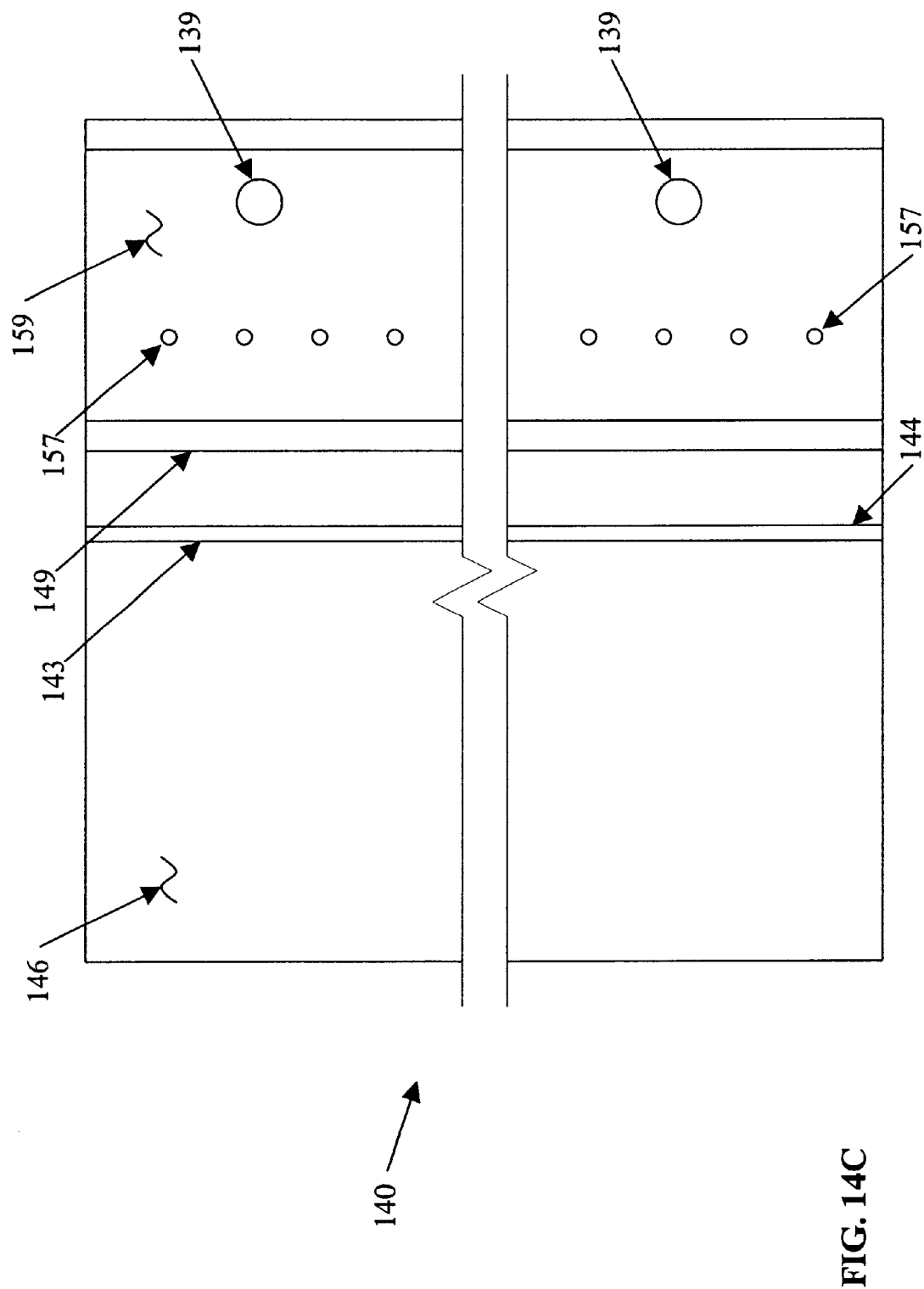
FIG. 14C is a top elevational view of the system of FIG. 14A.

FIGS. 14A to 14C depict a practical embodiment of a cut-off constructive occlusion system 140 with a specular shoulder, for providing planar uniformity of illumination. For convenience, the embodiment is shown with the aperture facing upward. However, the system may be turned over to provide down lighting, for example to illuminate objects on a shelf in a display case. As an alternative, in a display case, the system may be mounted along the lower front edge of the display area to evenly illuminate the front surfaces of objects standing in the case. In this later use, the system 140 would be oriented as if turned approximately 90° clockwise from the orientation shown in FIG. 14A.

The illustrated embodiment comprises a roughly j-shaped substrate. In the end-view of FIG. 14A, the j of the substrate is backwards or reversed and turned on its side. In this embodiment, the j-shaped substrate comprises two sections 137 and 138 held together by a bolt 139 or other fastener. The two sections of the substrate may be formed of aluminum, plastic or other convenient materials. Those skilled in the art will recognize that the substrate could be formed as a single extruded element, eliminating the need for fasteners to join the sections.

The section 137 provides the base 141. In this embodiment, the cavity 143 is formed in the base 141. A coating 144 of a diffuse reflective material, such as SPE-TRALON or a hi-gloss white paint, gives the cavity 143 the desired diffuse reflectivity, as in the earlier embodiments. The aperture 145 of the cavity 143 forms the active optical area of the base 141. Such an embodiment could use a partially spherical cavity with a half-circular aperture, as in the earlier embodiments. However, as shown in the front (FIG. 14B) and top (FIG. 14C) views, this embodiment is elongated in one direction. As a result, the aperture 145 is rectangular, in a manner similar to that of the embodiment of FIGS. 8A to 8C. If the system becomes quite long, and the cavity is relatively narrow, the aperture becomes a narrow slit and is almost linear in nature.

In an ideal case, the cavity 143 could take the form of a cut-off section of a half cylinder or the like, for example, as if the cavity 93 in FIGS. 8A to 8C had been cut in half along its length. In cross-section, such a cavity would appear as a quarter circle, as approximated by the dot-dashed line at 150 in FIG. 14A. The back wall would appear as a flat surface, as indicated by the dot-dash line 151 in the drawing. Similarly, the underside of the mask would extend to the flat wall, as illustrated in dot-dashed form at 152.

In practical manufacturing techniques, the corner where the cavity joins to the back wall along what corresponds to the cut becomes rounded, as shown in solid lines in FIG. 14A. As a result, the portion of the cavity wall 144 in the curved area of the j of the substrate essentially becomes a reflective wall for optically dividing the system in half and reflecting the energy in the opposite direction, analogous to the lower section of the wall 129 at the back of the cavity 123 in the embodiment of FIG. 12B. The intersection of the mask and wall also tends to merge or become rounded to form a curved joint, as shown in solid lines in the drawing.

A shoulder 146 extends along the outer edge of the cavity 143 and the aperture 145. In this embodiment, the surface of the shoulder 146 preferably is specular. For example, if the section 137 of the substrate is aluminum, the surface of the shoulder 146 preferably is polished to make it highly reflective. The shoulder could be parallel to or in substantially the same plane as the aperture 145. However, in this embodiment, the plane is inclined at an angle relative to the aperture, to limit the field of view somewhat and increase the intensity of illumination at angles approaching the limited field of view.

The section 138 of the substrate forms the mask 147. A coating 148 of a diffuse reflective material, such as SPE-TRALON or a hi-gloss white paint, is formed on the surface of the mask 147 facing substantially toward the aperture 145 of the cavity 143. The coating 148 gives the facing surface(s) of the mask 147 the desired diffuse reflectivity, as in the earlier embodiments.

The joined sections 137 and 138 together with portions of the coatings 144, 148 form a reflective wall 153, with a diffuse reflective characteristic. This wall extends from the cavity 143 to one edge of the facing surface of the mask 147. This wall could be entirely flat, for example as in the embodiments of FIGS. 12B and 13A. However, for convenience of manufacture, the wall is actually rounded so as to become substantially continuous with the lower portion of the cavity and the underside of the mask (in the illustrated orientation). Also, sharp corners tend to be light traps because it takes more reflections for the light to get out of the sharp corners. The rounded sections have less area and are less prone to trap light and therefore are somewhat more efficient.

This embodiment also includes a reflective wall extending along a periphery of the mask 147 and away from the base 141, but in this embodiment, that second wall is not coplanar with the first wall 153. Here, the second wall 149 is a specular wall extending from the front edge of the mask 147 away from the base 141 and the aperture 145. The wall 149 could slant at an angle, but preferably the wall 149 extends substantially perpendicular to the aperture 147 and the major surface of the mask 147. The exterior reflective wall 149 could have other reflective characteristics, but preferably the surface of the wall 149 is specular. For example, if the section 138 of the substrate is aluminum, the surface of the wall 149 preferably is polished to make it highly reflective.

The wall 149 serves to limit the field of view of the system and mirror images at least a portion of the system, in much the same manner as the portion 131 of the wall 129 in the embodiment of FIGS. 12A and 12B. However, the structure shown in FIGS. 14A to 14C is easier to manufacture and more durable.

The illustrated embodiment may be used in a variety of transducer system applications. As such, the energy transducer could be a source or a sensor of any particular desired range of frequencies or wavelengths of radiant energy. The preferred implementation of this system 140 provides uniform illumination, therefore the system uses a visible light source. The system could use a tubular lamp or one or more bulbs located between the surfaces 144, 148 and 153, but preferably the system 140 utilizes a remote source and a plurality of optical fibers. Although the source and fibers are not shown for convenience, the drawings do show openings 157 for coupling the distal ends of the fibers into the interior of the system for processing in accord with the invention. The openings 157 for the fibers may be located about every ⅛" along the length of the system 140 (see FIG. 14C). The upper portion 138 of the substrate includes upright sections 159 that form walls of a housing to enclose the optical fibers.

In operation, light emerges through the passages 157 and is directed towards the aperture 145 and into the cavity 143. The surface 144 diffusely reflects the light. The mask 147 constructively occludes the aperture 145 with respect to the intended field of illumination, as in earlier embodiments. The diffused light reflects and diffuses many times between the cavity surface 144, the mask surface 148 and the inner reflective wall 153. Until it emerges through the gap between the edge of the aperture 145 and the edge of the mask 147.

The distance separating the mask from the aperture and the relative dimensions of the mask and aperture determine the performance of the mask and cavity part of the system. The inclined shoulder 146 and the outer wall 149 limit the angular range of emissions from the system 140. The field of view can be adjusted by modifying the placement and/or the length of the surfaces 146 and 149. Because of their specular reflectivity, the shoulder and the wall direct certain light emerging through the gap into more desirable regions of the illuminated area. In this manner, the system 140 provides a precisely tailored intensity distribution over the intended field or footprint for illumination. Preferably, this distribution provides a substantially uniform planar distribution over the intended footprint of illumination. Since all of the light emerges to essentially one side of the system, that is to say in an asymmetric fashion, the system 140 produces a relatively higher intensity over the asymmetric angular range.

In the display case application, the system 140 illuminates almost a 90° field of view. If the lighting system 140 is mounted along an upper back corner of the case, it will uniformly illuminate a plane extending out about two feet from the case wall and three feet down from the corner along the other axis.

The above discussion assumed use of optical fibers to supply light to the openings or passages 157 for processing within the other elements of the system. An alternative is to utilize one or more light sources located within the housing area 159, which are coupled to supply light directly through the openings 157.

FIGS. 15A to 15D depict still another embodiment, utilizing the inventive principles, here including the specular shoulder, the retro-reflector and one or more reflective walls that optically cut-off the constructive occlusion system. Here, the system 160 includes a base 161 and a radiant energy transducer 162. Although the transducer could be an energy detector for sensing radiant energy of a desired wavelength range, the transducer 162 typically is a halide lamp or other light source.

Figure 15A:
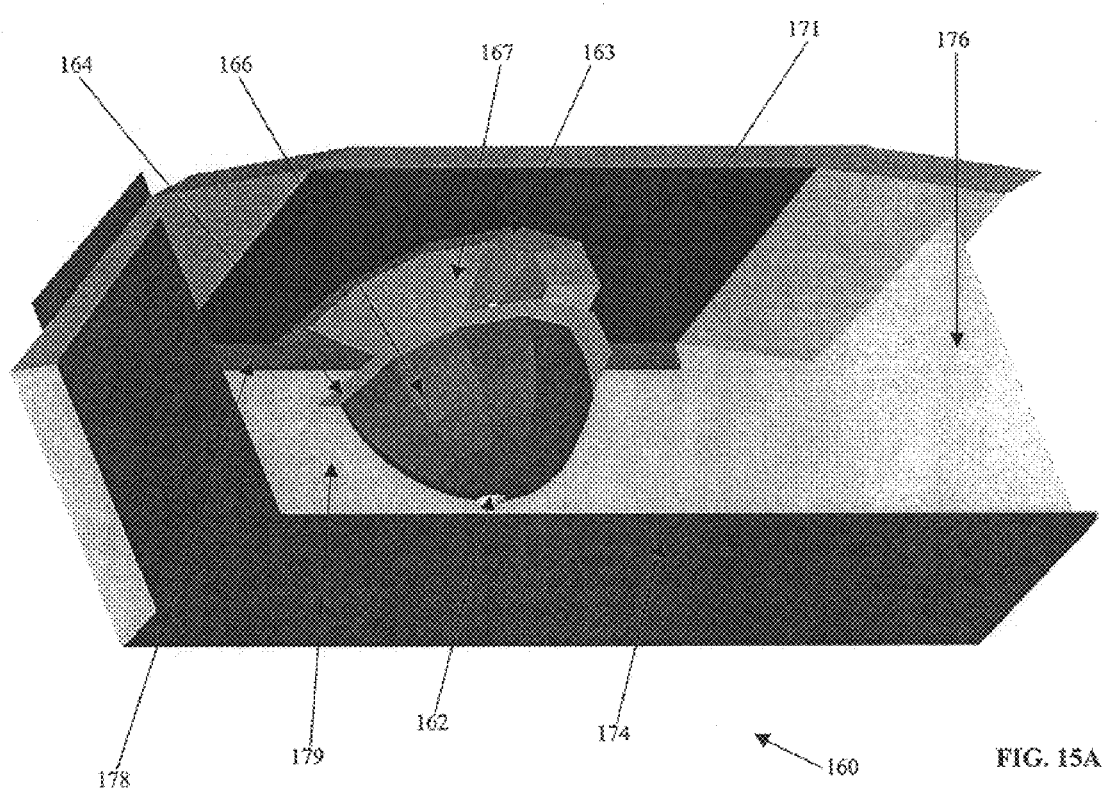
FIG. 15A is an isometric view of an embodiment similar to that of FIG. 12A or that of FIG. 13B, with a conical baffle located within the cavity and with a retro-reflector opposite the cavity.
Figure 15B:
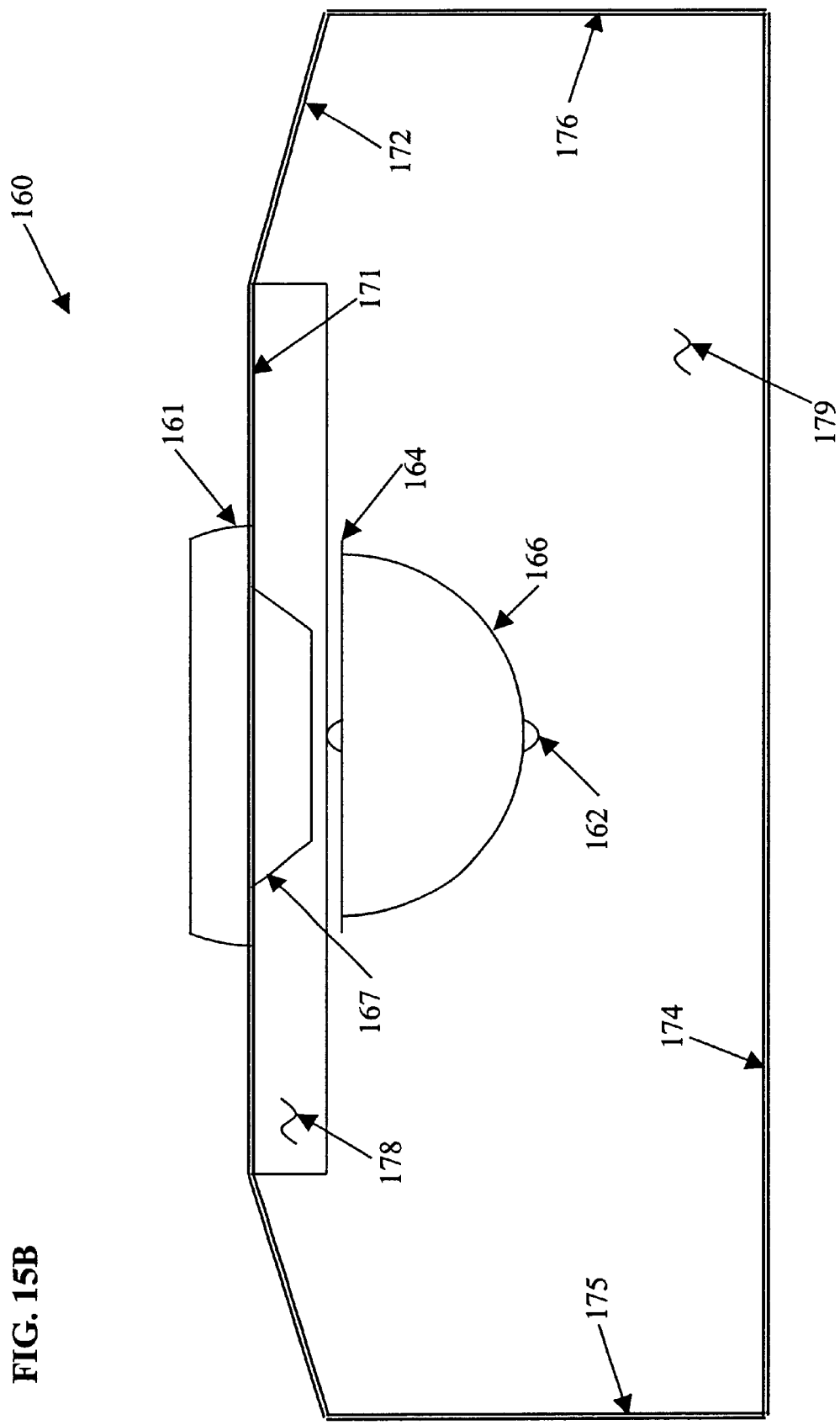
FIG. 15B is a front elevational view of the system of FIG. 15A.
Figure 15C:
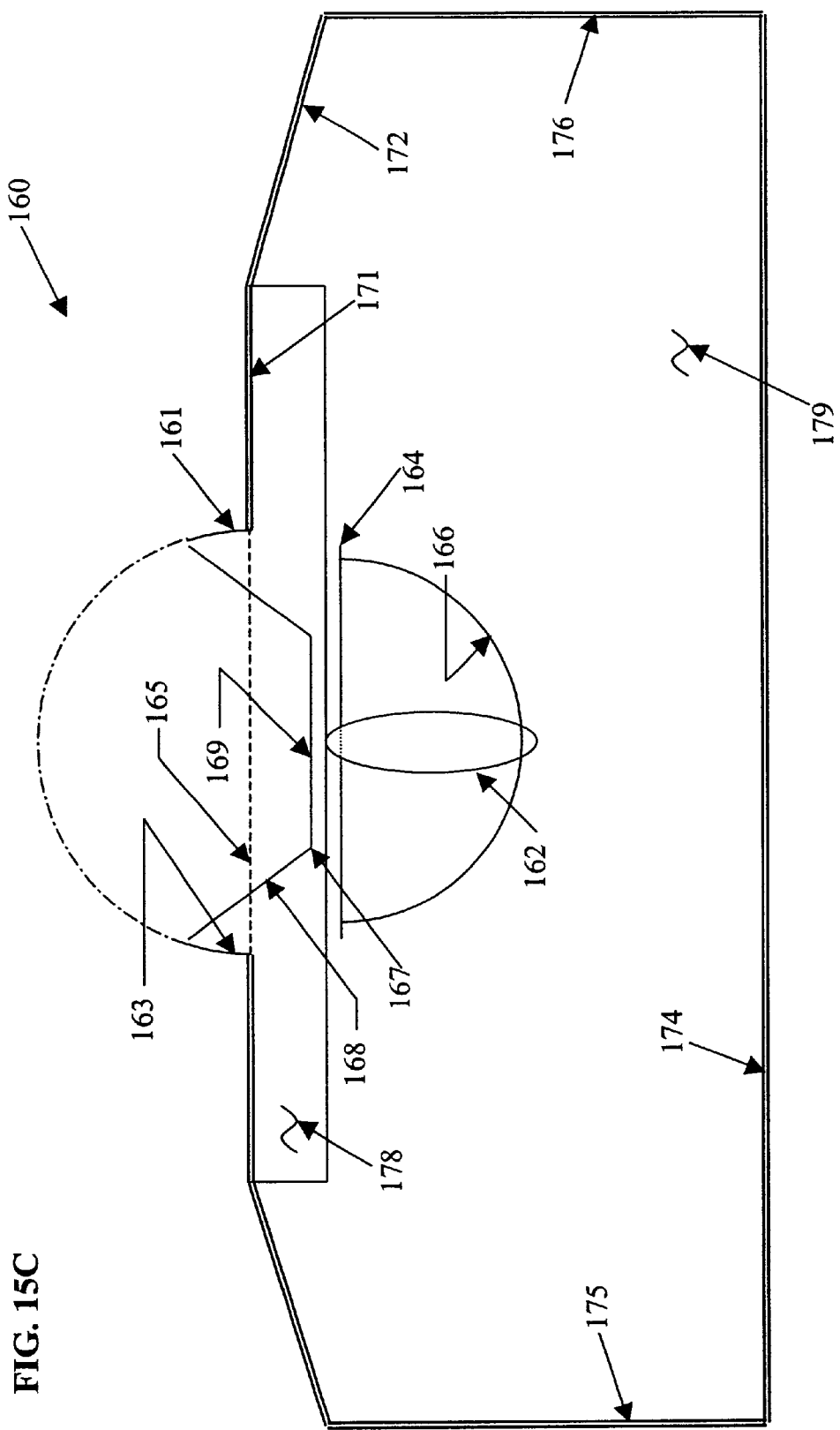
FIG. 15C a front elevational view of the system, similar to that of FIG. 15B, but with portions of the cavity wall and the reflector dome of the mask shown in cross-section.

In this embodiment, the diffusely reflective cavity 163 resides within the base 161 (FIGS. 15C, 15D). The cavity may have a variety of shapes, but in the illustrated example, the cavity 163 takes the form of a short arc of a quarter of a sphere.

In a typical constructive occlusion system, the active area of the base is somewhat larger than the mask, so that the mask occludes a portion but not all of the active area of the base with respect to the field of view or desired area of illumination by the system. In the system 160, a mask 164 constructively occludes the aperture 165 of the cavity 163. In the illustrated example, the mask 164 and the aperture 165 are semi-circular and have a common central axis. On the flat side of the semi-circles, the mask and aperture abut a perpendicular plane. In the radial directions, the aperture 165 is slightly larger in radius than the mask 164.

In this embodiment, the mask 164 takes the form of a quarter-spherical dome. A shoulder around the opening of the dome extends radically outward. The interior surface 166 of the dome serves as a reflective housing for the radiant energy transducer 162.

The interior surface of the cavity 163 is diffusely reflective. The aperture 165 approximates a Lambertian surface. The reflective inner surface 166 of the mask 164 may be specular but preferably is diffusely reflective. The surface of the shoulder portion of the mask 164 that faces toward the base 161 also should be diffusely reflective. Examples of appropriate diffusely reflective materials have been discussed above.

The cavity 163 could extend upward to form a substantially complete quarter of a sphere, as approximated by the dotted line in FIG. 15C. However, this embodiment includes a baffle 167 within the cavity 167, which allows truncation of the base and cavity. The baffle 167 has a flat, semi-circular, planar surface 169 formed about the axis of the mask 164 and the cavity 163. As noted earlier, the cavity may have other shapes. The baffle or kicker preferably has a shape corresponding to the shape of the cavity and its aperture. Hence, in this case, the end of the baffle 167 disposed within the cavity 163 as well as the flat planar surface 169 are substantially semi-circular in shape.

The planar surface 169 is substantially parallel to the cavity aperture. As illustrated, the surface 169 is disposed outside the cavity at a distance from the aperture 165, that is to say between the aperture and the mask 164 (below the aperture and above the mask in the illustrated orientation). However, the surface 169 could be in the plane of the aperture or on a plane within the cavity 163, or even somewhat within the reflector cavity 166, depending on the distribution characteristic desired. The sides of the semi-circular baffle 167 are beveled to form a half ring-like annular surface 168 at an angle with respect to the planar surface 169.

The baffle 167 may substantially fill the inner portion of the cavity corresponding to the dotted line in FIG. 15C. In the illustrated implementation, the baffle 167 comprises a semi-circular beveled disk or truncated conical plate extending across the truncated cavity 163. The shape and position of the baffle 167 within the cavity 163 leaves a segment of the cavity surface around the aperture 165 exposed to light. At least this segment of the cavity and the exposed surfaces of the baffle are highly, diffusely reflective.

The baffle 167 serves to reflect more of the light from the lamp 162 out to the periphery of the desired illumination footprint. When viewed from the area illuminated, the planar surface 169 appears brightest, if visible. A point on the surface 169 will diffusely reflect light, some of which will emerge from the device for direct illumination of the desired area. Other light diffusely reflected from such points will reflect back to the mask and/or other elements of the device several times before emerging within the desired range of angles to be illuminated.

The angled annular surface 168 of the baffle will appear to the observer to be slightly dimmer than the surface 169. A point on the surface 168 will diffusely reflect light, some of which will emerge from the device for direct illumination of the desired area. The light from this surface will fill in an area of the footprint somewhat closer to the axis than that illuminated by the planar surface 169. The intensity provided by the light from the surface 168 will be somewhat lower than that provided by the light from the surface 169, and the intensity will tend to decrease as the angle approaches the system axis (vertical downward in the illustrated orientation).

The segment of the cavity 163 exposed around the edge of the baffle 167 also diffusely reflects some light into the area of intended illumination. However, because of the angle of this segment, when viewed from the area illuminated the segment appears dimmer than either the surface 169 or the surface 168. The light from the cavity surface 163 will fill in an area of the footprint in regions closer to the axis than those illuminated by light reflected from surfaces of the baffle. The intensity provided by the light from the cavity 163 will be lower than that provided by the light from the surfaces 168, 169 of the baffle 167, and the intensity will tend to decrease as the angle of emission approaches the system axis. The exposed segment of the cavity 163 also reflects a substantial portion of light impacting on that surface back into the system for further reflections.

The invention contemplates use of a variety of different types and shapes of baffles. A more detailed description of such baffles and the effects thereof may be found in commonly assigned application Ser. No. 09/397,141 entitled "Apparatus for Projecting Electromagnetic Radiation with a Tailored Intensity Distribution," filed on Sep. 16, 1999, the disclosure of which is incorporated herein entirely by reference.

Each point on the device components that is diffusely reflective will reflect light in many different directions. The cavity 163, baffle 167, mash 164 and reflector 166 will reflect and diffuse each beam of light from the source many times before emission from the system 160. However, because of the highly reflective nature of the material surfaces, the device remains extremely efficient, with relatively little light absorbed within the system. The careful tailoring of the intensity distribution in fact maximizes the amount of emitted light kept within useful portions of the illuminated footprint, to maximize illumination efficiency within that area.

The inventive system 160 includes a reflective shoulder having regions 171, 172. The shoulder region 171 substantially surrounds the periphery of the aperture 165 and cavity 161. The shoulder region 171 extends outward from the edge of the aperture 165. Although different reflectivities may be used for different applications, preferably, the reflective shoulder region 171 has a specular reflective characteristic. The shoulder may be formed on a laterally extending rectangular plate. At a distance from the cavity aperture, the plate forming the shoulder is angled away from the plane of the aperture, that is to say downward in the orientation shown. In the angled regions 172 further from the cavity, the plate may still have a specular reflective characteristic or the shoulder sections 172 of the plate may be diffusely reflective.

The system 160 also includes a retro-reflector 174. In this embodiment, the retro-reflector 174 extends laterally across the vertical axis of the mask 164 and the cavity 161. The retro-reflector 174 is located at a distance from the mask and cavity and is essentially opposite the base and cavity. Together with sidewalls 175 and 176 and the shoulder panels 171, 172, the retro-reflector 174 forms an enclosure. The walls 175 and 176 are reflective. They may be retro-reflectors similar to the wall 174, but in the illustrated embodiment, these walls have a specular mirror-like finish.

The back wall of the enclosure comprises the cavity dividing mirror 178 and the planar reflecting wall 179. The mirror 178 is specular. The wall 179 may be specular or diffuse. The system dividing properties of the mirror 178 and the reflecting wall 179 are similar to those of certain reflecting walls in the earlier embodiments, such as the surfaces 131, 133 on the wall 129 in the embodiments of FIGS. 12A, 12B and 13A.

The height of the various enclosure walls 171, 172, 174, 175 and 176 out from the back wall 179 limits the field of illumination of the mask and cavity system 160 in respective directions. For example, in this embodiment, the retro-reflector serves to limit the field of illumination at angles approaching the vertical system axis, in the orientation shown. The cavity and mask direct some of the light out and downward at an angle approaching the back wall 179 from the axis that is outside the desired field of illumination for the system 160. If such light were allowed to pass out of the field view, the loss of such out-of-range light energy would reduce the system efficiency.

However, in accord with this embodiment of the invention, the retro-reflector 174 extends outward out from the back wall 179 toward the field of view, and thus over the out-of-range area. A retro-reflector, such as the upper surface of the wall 174, reflects incident light back towards its source, along the same path or a path substantially parallel to the path of incidence. The retro-reflector 174 may be formed of various suitable materials, as discussed earlier. Thus, in the system 160, the retro-reflector 174 redirects light back to the aperture 165, the cavity 161 and mask 164, for further optical processing.

In this embodiment, the retro-reflective wall 174 takes the form of a straight wall at right angles to adjacent walls and extending perpendicular to the system axis. The retro-reflector may be angled or slanted or extended as appropriate to limit the field of view in a desired manner for a particular application.

FIG. 16A is a cross-sectional view of yet another embodiment of the invention involving use of one or more reflective walls to effectively cut-off the constructive occlusion system. The system 180 operates in a manner generally similar to the system 120 of FIG. 12A, except that the system 180 uses a flat active area on the base and a cavity formed in the mask.

Specifically, the system 180 comprises a base 181 having a diffusely reflective active optical area 183. The base 181 also includes a reflective shoulder 185 extending outward from active optical area 183.

The system 180 also includes a mask 187. In the particular orientation shown, the mask is positioned above the active optical area 183, although obviously this orientation will shift, for example, if the system 180 is rotated to sense or illuminate a different direction or range of angles. The mask 187 includes a reflective cavity 189. Preferably, the cavity surface is diffusely reflective, either because the mask is formed of a diffusely reflective material or because the surface is coated with a diffusely reflective material.

The active area 183 of the base 181 essentially is the area under the mask 187 and extending somewhat outward that irradiates light as a consequence of diffuse reflection, such that the light has a substantially uniform distribution at or above a predetermined cut-off intensity level, say approximately 50% of the maximum irradiation from any part of that surface area. Surrounding areas that irradiate light at a lower intensity are outside the active area. In the example, this active area may roughly correspond to a diffuse reflection of the aperture of cavity 89 in the surface of the base, i.e. as if the cavity and aperture actually resided in the base 181. The outer area of the base 181 then is part of the reflective shoulder 185.

In this embodiment, the cavity 189 and thus the mask 187 may have a variety of shapes. For example, as shown in FIG. 16B the mask and cavity may take the form of a segment of a spherical dome, e.g. approximating one quarter of a sphere. The aperture and the mask 187 are semi-circular. In an alternative version of this system (FIG. 16C) the mask and cavity may take the form of a segment of a straight-sided cylinder, e.g. approximating one quarter of a cylinder 187'. The aperture and the mask 187' are rectangular.

In either case, the inner surface of the cavity 123 is diffusely reflective, and as a result, the aperture forms a Lambertian, planar surface, along the bottom of the cavity 189 in the illustrated orientations. The active area 183 of the base also forms a Lambertian, planar surface.

These cut-off embodiments use a single reflective wall, with sections between the mask and cavity and outside the mask and cavity substantially coplanar. Thus, in the illustrated embodiment, a rigid, reflective wall 193 or 193' abuts the end of the base 181 or 181'. The wall extends at least from the base past the inner surface of the cavity 189 to a height substantially above the mask. Although the wall could be angled, preferably the angle of the wall is at or about 90° with respect to the planes of the active area and the aperture in the mask cavity.

In the example of FIGS. 16A, 16B and 16C, the system includes a reflective baffle 195 or 195' mounted on the wall in the space between the mask and the base. In this example, the baffle 195 or 195' has a specular reflectivity, whereas the section of the wall at the back of the cavity is diffusely reflective. The section of the wall 193 or 193' surrounding the mask 187 or 187' may be specular, but is diffusely reflective in the illustrated examples.

In an illuminating type system, for example, the system 180 emits light in a pattern similar to a fully symmetrical system, as if the dotted line or phantom potions shown in FIG. 16A were real. However, substantially all of the light emerges into the truncated field of view, to the left in FIG. 16A, increasing the power output in that field.

The necessary height of the reflective surface on the wall 193 or 193' depends on the size of the mask and cavity and the desired drop-off of the distribution for angles to the right of 0° in the illustrated orientation. The slope of the fall-off is proportional to the height of the reflective wall. The higher the wall, the sharper the fall-off of emission in that direction. Conversely, the shorter the wall, the slower the fall-off.

Like the other versions of the inventive transducer system, adjustment of the mask and aperture parameters and addition of a retro-reflector and/or a non-diffuse reflective material on the shoulder enables tailoring of the performance characteristic.

FIG. 17 represents a practical construction of an embodiment operating in accord with the principles of the invention discussed above, for example, relative to FIGS. 16A and 16C. The drawing is an end view of a system that may be used as an annunciator. The system includes a substrate 261 that, in an end or cross-section view as shown, takes the approximate form of a hook or J, albeit shown reversed and on its side. The substrate may be formed of any desired material, such as plastic or metal, that provides the desired structural strength to facilitate a particular application. The system also includes one or more coatings 265 built up on appropriate surfaces of the substrate 261. The coating 265 provides a bright-white finish with a highly diffuse reflectivity, for example similar to that of SPECTRALON.

A transducer 272 is located within the curve of the J, although other transducer arrangements may be used. In the annunciator application, the transducer takes the form of an elongated tubular light source. This source could be a fluorescent tube or neon light, but preferably is a xenon lamp.

Sections of the substrate 261 and the coating 265 form the system elements similar to those in the embodiment of FIGS. 16A, 16B. Portions shown below the line B form the elements of the base 281. For example, the portions of the diffusely reflective coating 265 below the line B serve as the active area 283 and the diffusely reflective shoulder 285. The portions of the substrate 261 and the coating 265 above the line M form the elements of the mask 287. These elements include the cavity with its diffuse inner surface 289.

This embodiment includes a first reflective wall at the back of the mask and cavity system. Portions of the substrate 261 and the coating 265 shown to the right of the line W form this wall. Optically, the portion of the white coating 265 to the right of the line serves as the diffusely reflective wall or baffle 295.

In this embodiment, the second reflective wall 293 is formed at the outer edge of the mask 287, by the white coating 265 on the appropriate section of the substrate 261. Although diffuse, the reflective wall 265 does operate in a manner generally analogous to the wall 149 in the embodiment of FIG. 14A.

Those skilled in the art will recognize that the inventive concepts disclosed above may be embodied in a variety of different practical implementations. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A radiant energy transducing system, comprising:
   a base having a diffuse active optical area which faces substantially toward at least a portion of an intended field of view of the system;
   a mask spaced from the base and positioned to occlude a portion of the active optical area of the base, a reflective surface of the mask facing substantially toward the active optical area of the base;
   a diffusely reflective cavity formed in one of the active optical area of the base and the surface of the mask;
   a first reflective wall extending from a side of the cavity to an edge of the other one of the active optical area of the base and the surface of the mask;
   a shoulder adjacent to and extending outward from a peripheral section of the active optical area of the base and having a reflective surface facing the field of view;
   a second reflective wall extending from a periphery of the mask away from the base; and
   an electromagnetic transducer for transducing between radiant energy associated with the active optical area and corresponding electrical signals,
   wherein the mask has a size in relation to the active optical area and is spaced a distance from the active optical area such that the system exhibits a predetermined performance characteristic with respect to the radiant energy over the intended field of view.

2. A system as in claim 1, wherein the cavity comprises a segment of a sphere or a segment of a cylinder.

3. A system as in claim 1, wherein at least one of the reflective walls has a substantially specular reflective characteristic.

4. A system as in claim 1, wherein the first reflective wall has a substantially diffuse reflective characteristic.

5. A system as in claim 1, wherein the reflective surface of the shoulder has a substantially specular reflective characteristic.

6. A system as in claim 1, wherein the first reflective wall and the second reflective wall are substantially coplanar.

7. A system as in claim 1, wherein the first reflective wall and the second reflective wall are not coplanar.

8. A system as in claim 7, wherein the second reflective wall extends from an outer edge of the mask in a direction away from the base.

9. A system as in claim 8, wherein the second reflective wall has a substantially specular reflective characteristic.

10. A system as in claim 8, wherein the first reflective wall comprises a curved section formed integral with at least one of the active optical area of the base and the surface of the mask.

11. A system as in claim 1, further comprising a retro-reflector arranged on a periphery of the system to redirect radiant energy directed by system components toward an area outside the intended field of view back into the system.

12. A system as in claim 11, wherein the retro-reflector is arranged along a periphery of the shoulder at a distance from the active optical area of the base.

13. A system as in claim 11, wherein the retro-reflector is arranged substantially opposite the active area of the base and at a distance from the mask at least along an axis of the active area and the mask, a retro-reflective surface of the retro-reflector facing substantially toward the base and the mask.

14. A system as in claim 1, wherein the cavity is formed in the mask.

15. A system as in claim 14, further comprising a substantially j-shaped substrate, wherein reflective surfaces of the shoulder, active area of the base, first wall and cavity comprise a diffusely reflective coating on appropriate sections of the j-shaped substrate.

16. A system as in claim 1, wherein the cavity is formed in the base, and the aperture of the cavity substantially forms the active area of the base.

17. A system as in claim 16, further comprising a substantially j-shaped substrate, wherein the reflective surfaces of the cavity, the wall and the mask comprise a diffusely reflective coating on appropriate sections of the j-shaped substrate.

18. A system as in claim 17, wherein the reflective surface of the shoulder comprises a polished section of the substrate adjacent the cavity, and a reflective surface of the second wall comprises a polished section of the substrate adjacent an edge of the mask.

19. A system as in claim 1, wherein the electromagnetic transducer comprises an elongated tubular lamp positioned between the mask and the base.

20. A system as in claim 1, wherein the electromagnetic transducer comprises:
    a light source positioned remote from the base and the mask;
    one or more optical fibers having proximal ends coupled the light source; and
    one or more openings through either the base or the mask coupled to distal ends of the one or more optical fibers, to supply light from the source to a region between the base and the mask.

21. A system as in claim 1, further comprising a baffle, having a highly diffusely reflective characteristic with respect to the radiant energy, located between the base and the mask, for increasing intensity of radiant energy distributed toward peripheral portions of the region to be illuminated.

22. A system as in claim 21, wherein the baffle comprises a cone extending from a broad end to a narrow end, and the broad end of cone is located within the cavity.

23. A system as in claim 22, wherein an annular surface of the baffle extends to the inner wall of the cavity.

24. A system as in claim 17, further comprising a retro-reflector located along an axis of the base and the mask substantially opposite the active area of the base and at a distance from the mask, a retro-reflective surface of the retro-reflector facing substantially toward the base and the mask.

25. A system as in claim 24, further comprising a pair of walls, extending from the shoulder to the retro-reflector, located on opposite sides of the base and mask, wherein opposing surfaces of the pair of walls have a reflective characteristic.

26. A radiant energy transducing system, comprising:
 a substrate having a substantially j-shaped cross-section forming a base, a mask and a connecting wall between the base and the mask;
 a reflective surface formed on the base, a portion of the reflective surface on the base constituting an active optical area of the base and another portion of the reflective surface on the base constituting a shoulder adjacent the active optical area;
 a cavity formed in the mask having an aperture facing substantially toward the active optical area of the base
 a reflective surface formed on the interior of the cavity;
 a reflective surface formed on the connecting wall; and
 an electromagnetic transducer for transducing between radiant energy associated with a region between the active optical area and the mask and corresponding electrical signals,
 wherein the mask has a size in relation to the active optical area and is spaced a distance from the active optical area such that the system exhibits a predetermined performance characteristic with respect to the radiant energy over a predetermined field of operation.

27. A system as in claim 26, wherein each of the reflective surfaces exhibits a substantially diffuse reflectivity.

28. A system as in claim 27, wherein the reflective surfaces comprise a substantially continuous reflective coating formed on appropriate regions of the substrate.

29. A system as in claim 26, wherein the substrate further comprises another wall adjacent a periphery of the aperture at a distance from the connecting wall and extending in a direction substantially away from the base, and the system further comprises a reflective surface formed on the other wall.

30. A system as in claim 29, wherein each of the reflective surfaces exhibits a substantially diffuse reflectivity.

31. A system as in claim 30, wherein the reflective surfaces comprise a substantially continuous reflective coating formed on appropriate regions of the substrate.

32. A system as in claim 31, wherein the cavity and the connecting wall consist of a continuous curved section of the j-shaped substrate extending from the active area of the base to a peripheral region of the mask.

33. A system as in claim 26, wherein the electromagnetic transducer comprises a light source.

34. A system as in claim 26, wherein the cavity comprises a segment of a cylinder.

35. A system as in claim 34, wherein the aperture is a substantially elongated rectangle, and the electromagnetic transducer comprises an elongated tubular member located between the active area of base and the reflective surface of the cavity.

36. A radiant energy transducing system, comprising:
 a substrate having a substantially j-shaped cross-section forming a base, a mask and a connecting wall between the base and the mask;
 a cavity formed in the base having an aperture facing substantially toward the mask;
 a reflective surface formed on an interior surface the cavity;
 a reflective surface formed on a surface of the mask facing substantially toward the aperture;
 a reflective surface formed on the connecting wall;
 a reflective surface formed on the shoulder; and
 an electromagnetic transducer for transducing between radiant energy in a region between the mask and the cavity and corresponding electrical signals;
 wherein the mask has a size in relation to the active optical area and is spaced a distance from the aperture such that the system exhibits a predetermined performance characteristic with respect to the radiant energy over a predetermined field of operation.

37. A system as in claim 36, wherein each of the reflective surfaces formed on the mask, the wall and the cavity comprise a coating having a substantially diffuse reflectivity with respect to the radiant energy.

38. A system as in claim 36, wherein the substrate further comprises another wall adjacent a periphery of the mask at a distance from the connecting wall and extending in a direction substantially away from the base, and the system further comprises a reflective surface formed on the other wall.

39. A system as in claim 29, wherein the reflective surface on the shoulder and the reflective surface of the other wall have substantially specular reflective characteristics.

40. A system as in claim 36, wherein the substrate comprises:
 a first section including the mask, the other wall and a first curved section of the connecting wall; and
 a second section including the base, the cavity, the shoulder and a first curved section of the connecting wall,
 wherein the first and second sections of the substrate are arranged such that the first curved section of the connecting wall abuts the second curved section of the connecting wall.

41. A system as in claim 36, wherein the electromagnetic transducer comprises a light source.

42. A system as in claim 41, wherein the cavity comprises a segment of a cylinder, and the aperture is a substantially elongated rectangle.

43. A system as in claim 42, wherein, and the light source comprises:
 a lamp separate from the base and mask;
 one or more optical fibers coupled at a proximal end to the lamp; and
 one or more openings through the mask coupled to a distal end of the one or more optical, to supply light from the source toward the cavity.

* * * * *